(12) United States Patent
Villa et al.

(10) Patent No.: US 12,347,325 B2
(45) Date of Patent: Jul. 1, 2025

(54) DYNAMIC AIRCRAFT ROUTING

(71) Applicant: Joby Aero, Inc., Santa Cruz, CA (US)

(72) Inventors: Ian Andreas Villa, San Francisco, CA (US); Eric Mueller, San Francisco, CA (US); Christabelle Bosson, Mountain View, CA (US); Thomas Prevot, San Jose, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/601,359

(22) Filed: Mar. 11, 2024

(65) Prior Publication Data

US 2024/0296744 A1 Sep. 5, 2024

Related U.S. Application Data

(63) Continuation of application No. 17/645,935, filed on Dec. 23, 2021, now Pat. No. 11,955,017, which is a
(Continued)

(51) Int. Cl.
*G08G 5/30* (2025.01)
*B64C 29/00* (2006.01)
(Continued)

(52) U.S. Cl.
CPC ............. *G08G 5/30* (2025.01); *G01C 21/20* (2013.01); *G06Q 10/047* (2013.01); *B64C 29/0008* (2013.01)

(58) Field of Classification Search
CPC .... G08G 5/003; G08G 5/0043; G08G 5/0026; G08G 5/0013; G08G 5/0091;
(Continued)

(56) References Cited

U.S. PATENT DOCUMENTS

| 3,035,789 A | 5/1962 | Young |
| 4,022,405 A | 5/1977 | Peterson |

(Continued)

FOREIGN PATENT DOCUMENTS

| EP | 0945841 A1 | 9/1999 |
| EP | 2698749 A1 | 2/2014 |

(Continued)

OTHER PUBLICATIONS

U.S. Appl. No. 16/169,726, Final Office Action mailed Aug. 14, 2019, 9 pages.
(Continued)

*Primary Examiner* — Abdhesh K Jha
(74) *Attorney, Agent, or Firm* — Dority & Manning, P.A.

(57) ABSTRACT

Example embodiments are directed to generating an optimized network of flight paths and an operations volume around each of these flight paths. A network system creates a source network of paths, whereby the source network comprises a set of possible paths between two locations. The network system assigns a cost for traversing each edge of each path of the source network and aggregates the cost for traversing each edge of each path to obtain a cost for each path of the source network. Based on the cost for each path, the network system identifies a path having the lowest cost, whereby the path having the lowest cost is the optimized route between the two locations. The network system then generates an operations volume for the optimized route. The operations volume represents airspace surrounding the optimized route. The operations volume is transmitted to a further system for use.

20 Claims, 15 Drawing Sheets

Related U.S. Application Data continuation of application No. 16/437,745, filed on Jun. 11, 2019, now Pat. No. 11,238,745, which is a continuation-in-part of application No. 16/405,493, filed on May 7, 2019, now Pat. No. 11,244,572.

(60) Provisional application No. 62/668,745, filed on May 8, 2018, provisional application No. 62/668,176, filed on May 7, 2018.

(51) Int. Cl.
   *G01C 21/20* (2006.01)
   *G06Q 10/047* (2023.01)

(58) Field of Classification Search
   CPC .... G08G 5/0039; G08G 5/006; G08G 5/0034; G06Q 10/047; G01C 21/20; G01C 23/00; B64C 29/0008
   See application file for complete search history.

(56) References Cited

U.S. PATENT DOCUMENTS

| | | |
|---|---|---|
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |
| 6,974,105 B2 | 12/2005 | Phm |
| 7,648,338 B1 | 1/2010 | Welsh |
| 7,665,688 B2 | 2/2010 | Cylinder et al. |
| 8,016,226 B1 | 9/2011 | Wood |
| 8,020,804 B2 | 9/2011 | Yoeli |
| 8,311,686 B2 | 11/2012 | Herkes et al. |
| 8,733,690 B2 | 5/2014 | Bevirt et al. |
| 8,737,634 B2 | 5/2014 | Brown et al. |
| 8,849,479 B2 | 9/2014 | Walter |
| 8,931,732 B2 | 1/2015 | Sirohi et al. |
| 9,205,930 B2 | 12/2015 | Yanagawa |
| 9,387,928 B1 | 7/2016 | Gentry et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,663,237 B2 | 5/2017 | Senkel et al. |
| 9,694,911 B2 | 7/2017 | Bevirt et al. |
| 9,771,157 B2 | 9/2017 | Gagne et al. |
| 9,776,715 B2 | 10/2017 | Zhou et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,828,107 B1 | 11/2017 | Ruymgaart et al. |
| 9,838,436 B2 | 12/2017 | Michaels |
| 10,011,346 B2 | 7/2018 | Beckman et al. |
| 10,122,806 B1 | 11/2018 | Florissi et al. |
| 10,140,873 B2 | 11/2018 | Adler et al. |
| 10,152,894 B2 | 12/2018 | Adler et al. |
| 10,216,190 B2 | 2/2019 | Bostick et al. |
| 10,249,200 B1 | 4/2019 | Grenier et al. |
| 10,304,344 B2 | 5/2019 | Moravek et al. |
| 10,330,482 B2 | 6/2019 | Chen et al. |
| 10,370,098 B1 | 8/2019 | Beckman et al. |
| 10,518,595 B2 | 12/2019 | Dietrich |
| 10,593,215 B2 | 3/2020 | Villa |
| 10,593,217 B2 | 3/2020 | Shannon |
| 10,752,365 B2 | 8/2020 | Galzin |
| 10,759,537 B2 | 9/2020 | Moore et al. |
| 10,768,201 B2 | 9/2020 | Luo et al. |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 10,960,975 B1 | 3/2021 | Villa |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2006/0155464 A1 | 7/2006 | Smartt |
| 2009/0157293 A1 | 6/2009 | Cornett et al. |
| 2009/0164260 A1 | 6/2009 | Kane |
| 2010/0079342 A1 | 4/2010 | Smith et al. |
| 2010/0172510 A1 | 7/2010 | Juvonen |
| 2011/0056183 A1 | 3/2011 | Sankrithi et al. |
| 2011/0087428 A1 | 4/2011 | Barnetche et al. |
| 2012/0237049 A1 | 9/2012 | Brown et al. |
| 2014/0179535 A1 | 6/2014 | Stückl et al. |
| 2015/0379874 A1 | 12/2015 | Ubhi et al. |
| 2016/0311529 A1 | 10/2016 | Brotherton-Ratcliffe et al. |
| 2016/0368600 A1 | 12/2016 | Frolov et al. |
| 2017/0197710 A1 | 7/2017 | Ma |
| 2017/0274983 A1 | 9/2017 | Beckman et al. |
| 2017/0357914 A1 | 12/2017 | Tulabandhula et al. |
| 2018/0018887 A1 | 1/2018 | Sharma et al. |
| 2018/0029431 A1 | 2/2018 | Tang et al. |
| 2018/0053425 A1 | 2/2018 | Adler et al. |
| 2018/0061245 A1 | 3/2018 | Alder et al. |
| 2018/0082597 A1 | 3/2018 | Nicol et al. |
| 2018/0216988 A1 | 8/2018 | Nance |
| 2018/0286254 A1 | 10/2018 | Westervelt et al. |
| 2018/0286372 A1 | 10/2018 | Beckman et al. |
| 2018/0308366 A1 | 10/2018 | Goel et al. |
| 2018/0331940 A1 | 11/2018 | Jadhav et al. |
| 2018/0354636 A1 | 12/2018 | Damell et al. |
| 2019/0023385 A1 | 1/2019 | Nguyen |
| 2019/0033084 A1 | 1/2019 | Chen et al. |
| 2019/0047342 A1 | 2/2019 | Dietrich |
| 2019/0120640 A1 | 4/2019 | Ho et al. |
| 2019/0135426 A1 | 5/2019 | Bailie |
| 2019/0146508 A1 | 5/2019 | Dean et al. |
| 2019/0221127 A1 | 7/2019 | Shannon |
| 2019/0250636 A1 | 8/2019 | Szubbocsev |
| 2019/0316849 A1 | 10/2019 | Abrego et al. |
| 2019/0340933 A1 | 11/2019 | Villa |
| 2019/0340934 A1 | 11/2019 | Villa et al. |
| 2019/0340937 A1 | 11/2019 | Villa |
| 2020/0103922 A1 | 4/2020 | Nonami et al. |
| 2020/0388166 A1 | 12/2020 | Rostamzadeh et al. |
| 2021/0061459 A1 | 3/2021 | Erengil et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2016/093905 A1 | 6/2016 |
| WO | WO 2018/023556 A1 | 2/2018 |
| WO | WO 2019/089677 A1 | 5/2019 |
| WO | WO 2019/217427 A1 | 11/2019 |
| WO | WO 2020/251988 A1 | 12/2020 |
| WO | WO 2020/252024 A1 | 12/2020 |

OTHER PUBLICATIONS

U.S. Appl. No. 16/169,726, Non Final Office Action - Prioritized Exam mailed Mar. 25, 2019, 9 pages.
U.S. Appl. No. 16/169,726, Notice of Allowance mailed Nov. 6, 2019, 5 pages.
U.S. Appl. No. 16/169,726, Response filed Jun. 24, 2019 to Non-Final Office Action—Prioritized Exam mailed Mar. 25, 2019, 18 pages.
U.S. Appl. No. 16/169,726, Response filed Oct. 23, 2019 to Final Office Action mailed Aug. 14, 2019, 10 pages.
U.S. Appl. No. 16/405,493, Preliminary Amendment filed Apr. 23, 2020, 7 pages.
U.S. Appl. No. 16/405,493, Response filed Sep. 14, 2021 to Non Final Office Action mailed Jun. 14, 2021. 8 pages.
U.S. Appl. No. 16/437,745, Final Office Action mailed Jun. 10, 2021, 12 pages.
U.S. Appl. No. 16/437,745, Non Final Office Action mailed Mar. 4, 2021, 16 pages.

(56) References Cited

OTHER PUBLICATIONS

U.S. Appl. No. 16/437,745, Notice of Allowance mailed Sep. 23, 2021, 8 pages.
U.S. Appl. No. 16/437,745, Response filed Jun. 2, 2021 to Non Final Office Action mailed Mar. 4, 2021, 10 pages.
U.S. Appl. No. 16/437,745, Response filed Sep. 9, 2021 to Final Office Action mailed Jun. 10, 2021, 12 pages.
Application Serial No. PCT/US2020/036953, Written Opinion of the International Preliminary Examining Authority mailed May 4, 2021, 4 pages.
Bennaceur et al., "Passenger-centric urban air mobility: Fairness trade-offs and operational efficiency", Transportation Research Part C: Emerging Technologies, 2022, 29 pages.
De Jong, "Optimizing Cost Effectiveness And Flexibility of Air Taxis", Haarlem, 2007, 62 pages.
Downing et al., "Noise Simulation Modeling For Airport Noise Analysis Noise Simulation Modeling For Airport 6 Noise Analysis", The 33rd International Congress And Exposition on Noise Control Engineering, 2004, 9 pages.
Drupka et al., "An Airspace Model Applicable For Automatic Flight Route Planning Inside Free Route Airspace", Scientific Letters of Rzeszow University of Technology—Mechanics, 2018, pp. 5-18.
European Application Serial No. 19726243.9, Communication Pursuant to Article 94(3) EPC mailed Dec. 17, 2021, 6 pages.
European Application Serial No. 19726243.9, Response to Communication Pursuant to Rules 161 and 162 filed Jun. 25, 2021, 13 pages.
Givargis et al., "A Basic Neural Traffic Noise Prediction Model For Tehran's Roads", Journal of Environmental Management, Elsevier, Amsterdam, NI, vol. 91, No. 12, 2010, pp. 2529-2534.
International Application Serial No. PCT/US2019/031124, International Preliminary Report on Patentability mailed Nov. 19, 2020, 9 pages.
International Application Serial No. PCT/US2019/031124, International Search Report mailed Jul. 19, 2019, 5 pages.
International Application Serial No. PCT/US2019/031124, Written Opinion mailed Jul. 19, 2019, 7 pages.
International Application Serial No. PCT/US2020/036953, International Search Report mailed Sep. 10, 2020, 5 pages.
International Application Serial No. PCT/US2020/036953, International Preliminary Report On Patentability Mailed Sep. 10, 2021, 8 pages.
International Application Serial No. PCT/US2020/036953, Written Opinion mailed Sep. 10, 2020, 6 pages.
International Application Serial No. PCT/US2020/037002, International Search Report Mailed Sep. 24, 2020, 4 pages.
International Application Serial No. PCT/US2020/037002, International Preliminary Report On Patentability Mailed Dec. 14, 2021, 8 pages.
International Application Serial No. PCT/US2020/037002, Written Opinion Mailed Sep. 24, 2020, 7 pages.
Jang et al., "Concepts of Airspace Structures And System Analysis For uas Traffic Flows For Urban Areas", Aim Information Systems—AIAA Infotech@ Aerospace, 0449, 2017, 16 pages.
Jong, "Optimizing cost effectiveness and flexibility of air taxis: A case study for optimization of air taxi operations", University of Twente, Master's thesis, 2007, 62 pages.
Miao et al., "Data-driven robust taxi dispatch under demand uncertainties", IEEE Transactions on Control Systems Technology 27, No. 1, 2017, 16 pages.
Miao et al., "Taxi dispatch with real-time sensing data in metropolitan areas: A receding horizon control approach", In Proceedings of the ACM/IEEE Sixth International Conference on Cyber-Physical Systems, 2015, 15 pages.
Peterson, "Fast Forwarding to a World of On-Demand Air Transportation", Smart Urban Transportation Forum, 2017, 44 pages.
Peterson, "Fast Forwarding to a World of On-Demand Air Transportation Part 2 of 2", Smart Urban Transportation Forum, 2017, 23 pages.
U.S. Appl. No. 16/169,726, filed Oct. 24, 2018, 32 pages.
Uber, "Fast-forwarding to a future of on-demand urban air transportation", 2016, 99 pages.
Uber, "Fast-Forwarding to a Future of On-Demand Urban Air Transportation", Uber Elevate, 2016, 98 pages.
Van Der Zwan et al., "Development of An Aircraft Routing System For an Air Taxi Operator", 2016, 24 pages.
Yang et al., "Airport Noise Simulation Using Neural Networks", Neural Networks, 2008. Ijcnn 2008. {IEEE World Congress On Computational Intelligence). IEEE International Joint Conference On, IEEE, 2008, pp. 1917-1923.

US 12,347,325 B2

DYNAMIC AIRCRAFT ROUTING

CROSS REFERENCE TO RELATED APPLICATIONS

This application is a continuation of U.S. patent application Ser. No. 16/437,745, filed Jun. 11, 2019, which is a continuation-in-part application of U.S. patent application Ser. No. 16/405,493, filed May 7, 2019 and entitled "Dynamic Aircraft Routing," which claims the benefit of U.S. Provisional Application No. 62/668,176, filed May 7, 2018 and U.S. Provisional Application 62/668,745 filed May 8, 2018. The contents of these prior applications are considered part of this application and are hereby incorporated by reference in their entirety.

TECHNICAL FIELD

The subject matter described herein generally relates to aviation transport networks, and in particular to dynamic aircraft routing using an optimized network of lanes and corresponding operations volumes.

BACKGROUND

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

BRIEF DESCRIPTION OF THE DRAWINGS

Some embodiments are illustrated by way of example and not limitation in the figures of the accompanying drawings.

FIG. 10 shows a network of vertiports and flights between.

DETAILED DESCRIPTION

Figure 1:
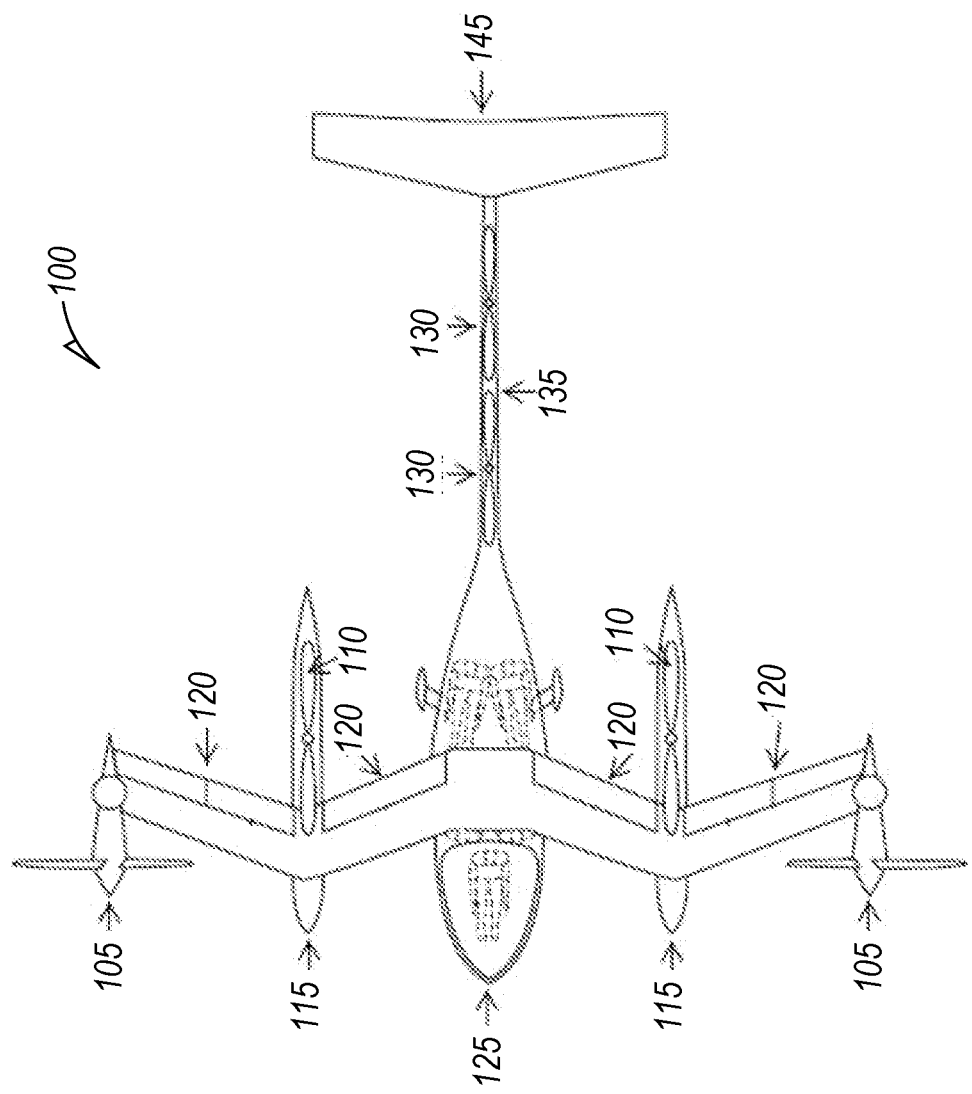
FIG. 1 illustrates an electric VTOL aircraft, in accordance with an embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example aspects of the present disclosure are directed to various systems, apparatuses, non-transitory computer-readable media, user interfaces, and electronic devices. For instance, a transport network coordination system determines a provisioned route for transport services by a VTOL aircraft from a first hub to a second hub and provides routing information to the VTOL aircraft responsive to determining the provisioned route. Network and environmental parameters such as the number of VTOL aircraft that will be at the origin hub within a specified time period, the number of VTOL aircraft that have a planned route between the origin hub and the destination hub, and predetermined acceptable noise levels in the vicinity of the hubs may be used to generate candidate routes for the VTOL aircraft. Candidate route may optimize for a different parameter or combination of parameters, for example, avoiding routes through areas in which the predetermined acceptable noise level is low or routes that pass within a threshold distance of planned routes for a number of other VTOL aircraft. The system calculates a noise profile for each candidate route and may select a candidate route that has the earliest estimated time of arrival at the destination hub and that does not exceed a threshold noise level at any point along the route. In other embodiments, different network and/or environmental parameters may be used to select the preferred route.

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel may reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL (eVTOL) aircraft technically and commercially viable. Electric VTOL aircraft may be quieter than aircraft using other power sources, which further increases their viability for use in built-up areas where noise may be a concern.

Some embodiments of the present disclosure relate to real-time mitigation of an aircraft's noise signature and perceived noise impact by observers using onboard sensing, network data, and temporal noise data at a geolocation assuming a trajectory that has been defined or predetermined.

In normal operation, a transport network coordination system determines optimal trips or trajectories for air vehicles to fly. Part of determining optimality is reducing the impact of the vehicle's noise signature on the environment the vehicle flies over. While the vehicle may utilize onboard sensors to determine their noise impact, a vehicle may also utilize offboard sensing, network, and predictive temporal data for noise signature mitigation. By building a composite understanding of real data offboard the aircraft, the aircraft can make adjustments to the way it is flying and verify this against a predicted noise signature (via computational methods) to reduce environmental impact. For an arbitrary configuration, this might be realized via a change in translative speed, propeller speed, or choices in propulsor usage (e.g., a quiet propulsor vs. a high thrust, noisier propulsor). These noise mitigation actions may also be decided at the network level rather than the vehicle level to balance concerns across a city and relieve computing constraints on the aircraft.

In other embodiments, various approaches are used to understand noise levels around vertiports (VTOL hubs with multiple takeoff and landing pads). In one embodiment, a method for location-based noise collection for the purpose of characterizing a vertiport's noise signature and quantifying community acceptance is enabled by microphones within a distance from the vertiport and processed by the network to filter for data quality, relative location, and directionality of collection.

In other embodiments, a distributed array of sensors is used to gather operational data. This array can cover various communication bands and may be composed of sonic, ultrasonic, IR, LIDAR, lighting, barometric, humidity, temperature, camera, and radar systems. This array solution can be distributed across a vertiport to support a multitude of use cases and in various geographic locations. Moreover, in one embodiment, the array is modular and may allow integration across different vertiport types to support low and high throughput.

The data collected by the array may enable improved landing and/or takeoff at a vertiport by an aircraft given microclimate weather conditions and an understanding of in-operation aircraft controllability in various flight modes. The data collected by the array may also be used in mitigating the overall noise signature of a vertiport. In one embodiment, this is achieved through the alteration of operations via throughput, routing, and aircraft selected for landing/departure. This can be enabled through real noise data (collected via the vertiport, adjacent aircraft, ground based infrastructure, ground observers, and ground vehicles) and estimated noise data (analyzed via computational aerodynamics/aeroacoustics/perception) which can be combined for composite understandings.

Example Vertical Take-Off and Landing Aircraft

Turning now to the specifics of the vehicle, FIG. 1 illustrates one embodiment of an electric VTOL aircraft 100. In the embodiment shown in FIG. 1, the VTOL aircraft 100 is a battery-powered aircraft that transitions from a vertical take-off and landing state with stacked lift propellers to a cruise state on fixed wings.

The VTOL aircraft 100 has an M-wing configuration such that the leading edge of each wing is located at an approximate midpoint of the wing. The wingspan of a VTOL aircraft 100 includes a cruise propeller 105 at the end of each wing, a stacked wing propeller 110 attached to each wing boom 115 behind the middle of the wing, and wing control surfaces 120 spanning the trailing edge of each wing. At the center of the wingspan is a fuselage 125 with a passenger compartment that may be used to transport passengers and/or cargo. The VTOL aircraft 100 further includes two stacked tail propellers 130 attached to the fuselage tail boom 135 and a hinged control surface 140 (not shown) spanning the bottom length of the tail boom 135. A lifting T-tail 145 provides stability to the VTOL aircraft 100.

During vertical ascent of the VTOL aircraft 100, the rotating cruise propellers 105 on the nacelles are pitched upward at a 90-degree angle and the stacked propellers 110 and 130 are deployed from the wing booms 115 and the tail boom 135 to provide lift. The wing control surfaces 120 are pitched downward and the tail control surface 140 tilts to control rotation about the vertical axis during takeoff. As the VTOL aircraft 100 transitions to a cruise configuration, the nacelles rotate downward to a zero-degree position such that the cruise propellers 105 are able to provide forward thrust. Control surfaces 120 and 140 return to a neutral position with the wings and tail boom 135, and the stacked lift propellers 110 and 130 stop rotating and retract into cavities in the wing booms 115 and tail boom 135 to reduce drag during forward flight.

During transition to a descent configuration, the stacked propellers 110 and 130 are redeployed from the wing booms 115 and tail boom 135 and begin to rotate along the wings and tail to generate the lift required for descent. The nacelles rotate back upward to a 90-degree position and provide both thrust and lift during the transition. The hinged control surfaces 120 on the wings are pitched downward to avoid the propeller wake, and the hinged surfaces on the tail boom control surfaces 140 and tail tilt for yaw control.

Figure 2:
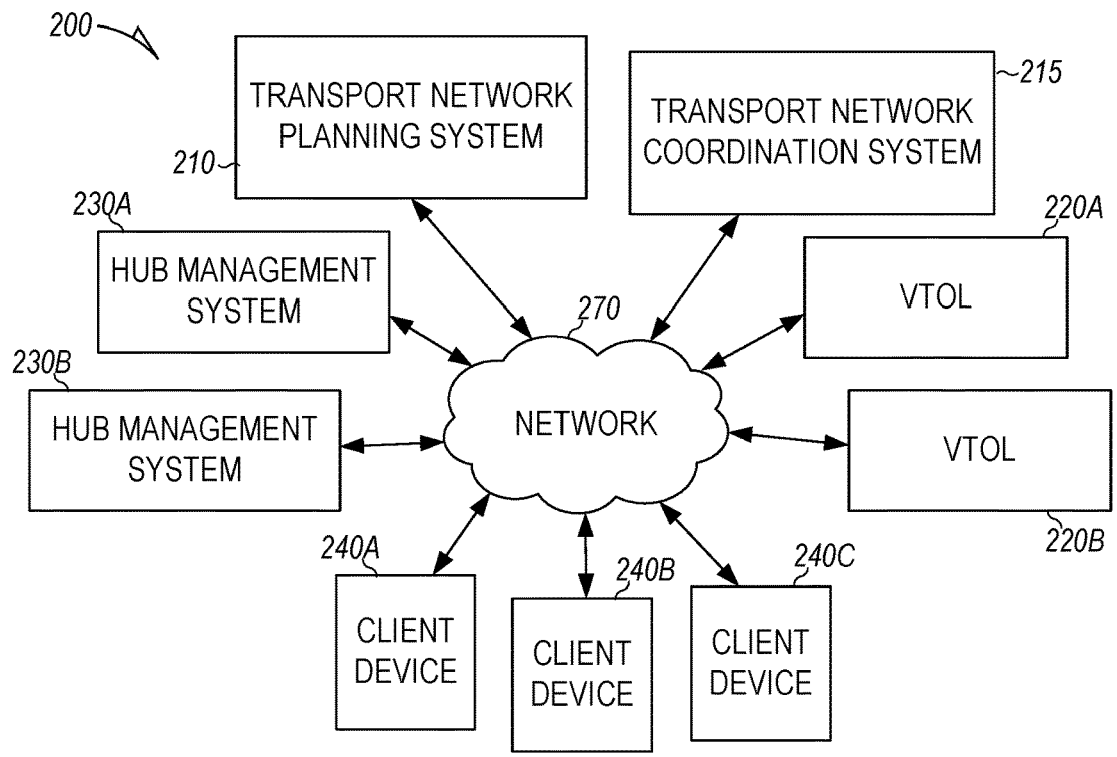
FIG. 2 is a high-level block diagram illustrating a computing environment associated with a transport network, in accordance with an embodiment.

FIG. 2 illustrates one embodiment of a computing environment 200 associated with an aviation transport network. In the embodiment shown in FIG. 2, the computing environment 200 includes a transport network planning system 210, a transport network coordination system 215, a set of VTOL aircraft 220A, 220B, a set of hub management systems 230A, 230B, and a set of client devices 240A, 240B, all connected via a network 270. In some embodiments, the VTOL aircraft 100 discussed above with respect to FIG. 1 may be included in one or more of the VTOL aircraft 220A and/or 220B.

When multiple instances of a type of entity are depicted and distinguished by a letter after the corresponding reference numeral, such entities shall be referred to herein by the reference numeral alone unless a distinction between two different entities of the same type is being drawn. In other embodiments, the computing environment 200 contains different and/or additional elements. In addition, the functions may be distributed among the elements in a different manner than described. For example, the hub management systems 230 may be omitted with information about the hubs stored and updated at the transport network planning system 210.

The transport network planning system 210 assists in the planning and design of the transport network. In one embodiment, the transport network planning system 110 estimates demand for transport services, suggests locations for VTOL hubs to meet that demand, and simulates the flow of riders and VTOL aircraft between hubs to assist in network planning. In one embodiment, suggested locations for VTOL hubs may be based in part on environmental factors such as the type of area (e.g., commercial or residential), predetermined acceptable noise levels in the area, historical weather patterns in the area, and/or other nearby transportation hubs (e.g., existing VTOL hubs, airports, train stations). The transport network planning system 210 obtains environmental data from publicly available data sources and stores the data in a map data store 325 or an environmental data store (not shown) for use by the transport network coordination system 215. The transport network planning system 210 further stores the locations of VTOL hubs in a hub data store (not shown).

The transport network coordination system 215 determines a route for transport services by a VTOL aircraft 220 from a first hub to a second hub and provides routing information to the VTOL aircraft 220, including what time to leave a first hub, which hub to fly to after departure, waypoints along the route, how long to spend charging before departure from the first hub or upon arrival at the second hub, and the identity of individuals to carry. The network coordination system 215 can determine the route based at least partly on an optimization process. The transport network coordination system 215 may also direct certain VTOL aircraft 220 to fly between hubs without riders to improve fleet distribution (referred to as "deadheading"). Various embodiments of the transport network coordination system 215 are described in greater detail below, with reference to FIG. 3.

The transport network coordination system 215 is further configured as a communicative interface between the various entities of the computing environment 200 and is one means for performing this function. The transport network coordination system 215 is configured to receive sets of service data representing requests for transportation services from the client devices 240 and creates corresponding service records in a transportation data store (not shown). According to an example, a service record corresponding to a set of service data can include or be associated with a service ID, a user ID, an origin hub, a destination hub, a service type, pricing information and/or a status indicating that the corresponding service data has not been processed. In one embodiment, when the transport network coordination system 215 selects a VTOL aircraft 220 to provide the transportation service to the user, the service record can be updated with information about the VTOL aircraft 220 as well as the time the request for service was assigned.

The VTOL aircraft 220 are vehicles that fly between hubs in the transport network. A VTOL aircraft 220 may be controlled by a human pilot (inside the vehicle or on the ground) or it may be autonomous. In one embodiment, the VTOL aircraft 220 are battery-powered aircraft that use a set of propellers for horizontal and vertical thrust, such as the VTOL aircraft shown in FIG. 1. The configuration of the propellers enables the VTOL aircraft 220 to take-off and land vertically (or substantially vertically). For convenience, the various components of the computing environment 200 will be described with reference to this embodiment. However, other types of aircraft may be used, such as helicopters, planes that take-off at angles other than vertical, and the like. The term VTOL should be construed to include such vehicles.

A VTOL aircraft 220 may include a computer system that communicates status information (e.g., via the network 270) to other elements of the computing environment 200. The status information may include current location, planned route, current battery charge, potential component failures, and the like. The computer system of the VTOL aircraft 220 may also receive information, such as routing and weather information and information regarding the current location and planned routes of VTOL aircraft 220 in the vicinity of the VTOL aircraft 220. Further, in some embodiments, the computer system of the VTOL aircraft 220 collects noise and weather data (e.g., data collected from other vehicles) and transmits the data to the transport network coordination system 215. Although two VTOL aircraft 220 are shown in FIG. 2, a transport network can include any number of VTOL aircraft 220.

Hub management systems 230 provide functionality at hubs in the transport network. A hub is a location at which VTOL aircraft 220 are intended to take off and land. Within a transport network, there may be different types of hub. For example, a hub in a central location with a large amount of rider throughput may include sufficient infrastructure for sixteen (or more) VTOL aircraft 220 to simultaneously (or almost simultaneously) take off or land. Similarly, such a hub may include multiple charging stations for recharging battery-powered VTOL aircraft 220. In contrast, a hub located in a sparsely populated suburb may include infrastructure for a single VTOL aircraft 220 and have no charging station. The hub management system 230 may be located at the hub or remotely and be connected via the network 270. In the latter case, a single hub management system 130 may serve multiple hubs.

In one embodiment, a hub management system 230 monitors the status of equipment at the hub and reports to the transport network planning system 210. For example, if there is a fault in a charging station, the hub management system 230 may automatically report that it is unavailable for charging VTOL aircraft 220 and request maintenance or a replacement. The hub management system 230 may also control equipment at the hub. For example, in one embodiment, a hub includes one or more launch pads that may move from a takeoff/landing position to embarking/disembarking position. The hub management system 230 may control the movement of the launch pad (e.g., in response to instructions received from transport network coordination system 215 and/or a VTOL aircraft 220).

The client devices 240 are computing devices with which users may arrange transport services within the transport network. Although three client devices 240 are shown in FIG. 2, in practice, there may be many more (e.g., thousands or millions) client devices connected to the network 270. In one embodiment, the client devices 240 are mobile devices (e.g., smartphones, tablets) running an application for arranging transport services. A user provides a pickup location and destination within the application and the client device 240 sends a request for transport services to the transport services coordination system 215. Alternatively, the user may provide a destination and the pickup location is determined based on the user's current location (e.g., as determined from GPS data for the client device 240).

The network 270 provides the communication channels via which the other elements of the networked computing environment 200 communicate. The network 270 can include any combination of local area and/or wide area networks, using both wired and/or wireless communication systems. In one embodiment, the network 270 uses standard communications technologies and/or protocols. For example, the network 270 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 270 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 270 may be represented using any suitable format, such as hypertext markup language (HTML) or extensible markup language (XML). In some embodiments, all or some of the communication links of the network 270 may be encrypted using any suitable technique or techniques.

Figure 3:
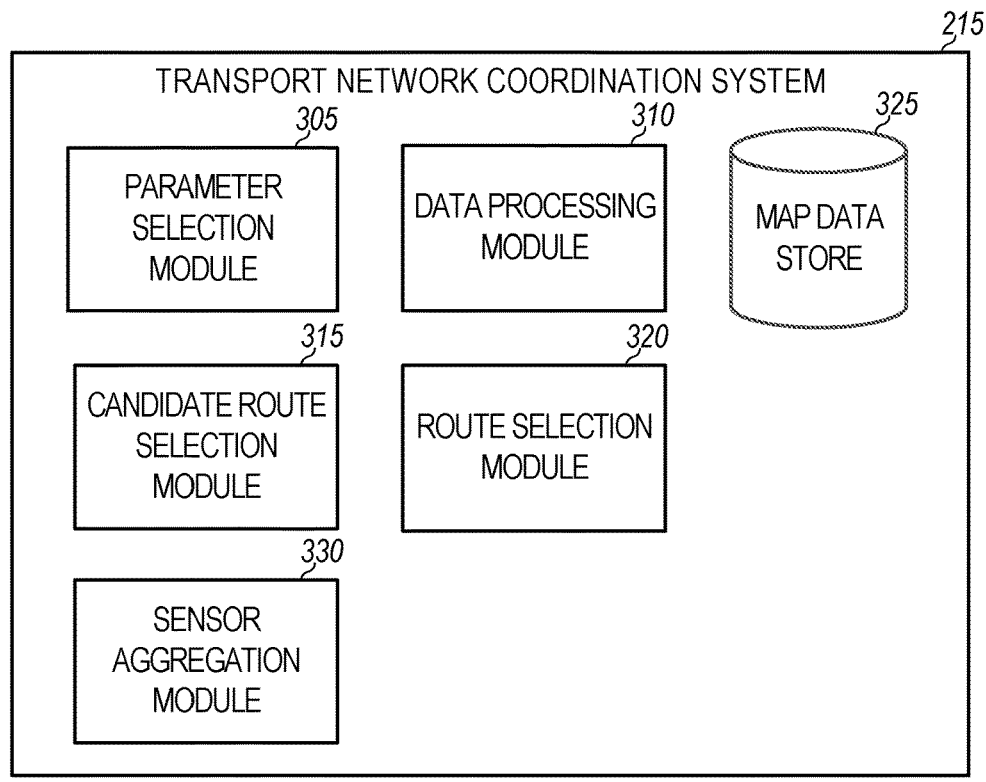
FIG. 3 is a high-level block diagram illustrating the transport network coordination system shown in FIG. 2, in accordance with an embodiment.

FIG. 3 illustrates one embodiment of the transport network coordination system 215. The transport network coordination system 215 determines a provisioned route for transport services by the VTOL aircraft 220 from a first hub to a second hub based on noise and weather data and data regarding the current locations and planned routes of other VTOL aircraft 220 within a threshold distance of the VTOL aircraft 220.

In the embodiment shown in FIG. 3, the transport network coordination system 215 includes a parameter selection module 305, a data processing module 310, a candidate route selection module 315, and a route selection module 320. In other embodiments, the transport network coordination system 215 includes different and/or additional elements. In addition, the functions may be distributed among the elements in a different manner than described.

The parameter selection module 305 provides a user interface for defining various parameters to be used in the optimization of VTOL route selection. In one embodiment, the definable parameters include network and environmental parameters and objectives. Network and environmental parameters may include a number of VTOL aircraft 220 that will be at the first hub within a specified time period, a number of VTOL aircraft 220 with a planned route between the first hub or the second hub, the presence and locations of VTOL hubs between the first hub and the second hub and the number and schedule of VTOL aircraft 220 intended to take-off or land at the VTOL hubs, environmental noise between the first hub and the second hub, the presence and location of other transportation hubs, current and predicted weather between the first hub and the second hub, and predetermined acceptable noise levels between the first hub and the second hub.

The network and environmental objectives may be to (1) avoid routes through areas in which the predetermined acceptable noise level is low (e.g., residential neighborhoods), (2) avoid areas of high environmental noise (e.g., train stations), (3) avoid routes that pass within a threshold distance of other transportation hubs (e.g., airports), (4) avoid routes where the current and/or predicted weather is unfavorable (e.g., high wind gusts or forces), (5) avoid routes that pass within a threshold distance of one or more VTOL hubs, (6) avoid routes that pass within a threshold distance of planned routes for a given number of other VTOL aircraft 220, (7) minimize predicted travel time, (8) minimize total distance traveled, and the like.

The data processing module 310 accesses network and environmental data needed to calculate candidate routes for VTOL travel based on one or more selected parameters and/or objectives. In one embodiment, the data processing module 310 queries the transport network planning system 210 to obtain data regarding the locations of VTOL hubs as well as the environmental data in the vicinity of the first hub and the second hub. In one embodiment, the data processing module 310 tracks localized weather and noise data and differentiates contributions from various actors (e.g., determines the type of cloud producing rain, determines whether a detected noise is due to birds or other VTOL aircraft).

In some embodiments, the data processing module 310 further queries the map data store 325 to obtain data regarding the presence, location, and planned routes of VTOL aircraft between the first hub and the second hub. The transport network planning system 210 and the map data store 325 return the requested information to the data processing module 310, which sends the information to the candidate route selection module 315 along with the selected objectives for the route.

In some embodiments, the data processing module 310 accesses network and environmental data needed to calculate candidate routes for VTOL travel based on one or more selected parameters and/or objectives. In one embodiment, the data processing module 310 queries the transport network planning system 210 to obtain data regarding the locations of VTOL hubs as well as the environmental data between the first hub and the second hub. The data processing module 310 further queries the transportation data store to obtain data regarding the presence, location, and planned routes of VTOL aircraft between the first hub and the second hub. The transport network planning system 210 and the transportation data store return the requested information to the data processing module 310, which sends the information to the candidate route selection module 315 along with the selected objectives for the route.

The candidate route selection module 315 identifies candidate routes for VTOL aircraft travel between a first hub and a second hub. In one embodiment, to determine the candidate routes, the candidate route selection module 315 computes different routes between the first hub and the second hub that each optimizes for a different parameter or combination of parameters associated with the network and environmental parameters and objectives. Each optimization function is associated with a set of optimized parameters and assigns weights to the optimized parameters such that the routing options generated by the function optimizes for parameters having higher weights relative to parameters having lower weights. For example, an optimization function may assign a higher weight to the network traffic along a candidate route relative to the total distance traveled, and therefore, the generated routing option may avoid areas in which other VTOL hubs are located, but travel a larger distance. In other embodiments, the candidate routes between the first and second hubs are determined in other ways. For example, a network planner may manually select a set of routes between the pair of hubs (e.g., by tracing them on a map, selecting a series of waypoints, or the like). Regardless of how the candidate routes are determined, in one example embodiment, the candidate route selection module 315 stores (e.g., in a database) a set of candidate routes between each pair of hubs in the transport network. The candidate routes from a first hub to a second hub may be the same or different from the candidate routes from the second hub to the first hub.

The route selection module 320 selects the routes for specific VTOL aircraft 220 traveling from a first hub to a second hub. In one embodiment, the route selection module 320 retrieves the candidate routes from the first hub to the second hub from the candidate route selection module 315 and selects one of the candidates as the preferred route between the first hub and the second hub based on the selected network and environmental parameters and objectives. The route selection module 320 calculates a noise profile for each candidate route based on the noise generated by the VTOL aircraft 220 and other predicted noise sources along the candidate route (e.g., other VTOL aircraft 220, typical noise levels in the area at that time) as well as the predetermined acceptable noise level in areas within a threshold distance of the candidate route. If the route selection module 320 determines that a noise profile exceeds a threshold level at any point along a candidate route, the route selection module 320 discards the candidate route as a possible option for the transport service. The route selection module 320 may select the candidate route that has the earliest estimated time of arrival at the second hub and that does not exceed the threshold noise level at any point along the route. Additionally or alternatively, different network and environmental parameters and objectives may be used to select the preferred route. For example, in one embodiment, the route selection module 320 calculates a route cost for each candidate route and selects the candidate route with the lowest route cost. The route cost may be a function of network and environmental factors such as the distance of the route, the anticipated amount of energy required to transport the VTOL aircraft 220 along the route, the cost to transport the VTOL aircraft 220 along the route, the anticipated noise level along the route, and anticipated observer annoyance.

The selected route is sent to the VTOL aircraft 220. In one embodiment, if the route selection module 320 determines that all of the candidate routes have noise profiles that exceed the threshold noise level, the route selection module 320 may notify the VTOL aircraft 220 that no acceptable routes currently exist for transport between the first hub and the second hub. The route selection module 320 may delay departure of the VTOL 220 and periodically (e.g., every five minutes) repeat the process until conditions have changed such that one of the candidate routes has a noise profile that does not exceed the noise threshold.

The sensor aggregation module 330 receives and aggregates data from various sensors. The sensors may include sonic, ultrasonic, passive IR, LIDAR, lighting, barometric, humidity, temperature, camera, and radar systems spread across various communication bands and in different quantities to support a variety of use cases. Some example use cases are described below, with reference to FIG. 4.

Figure 4:
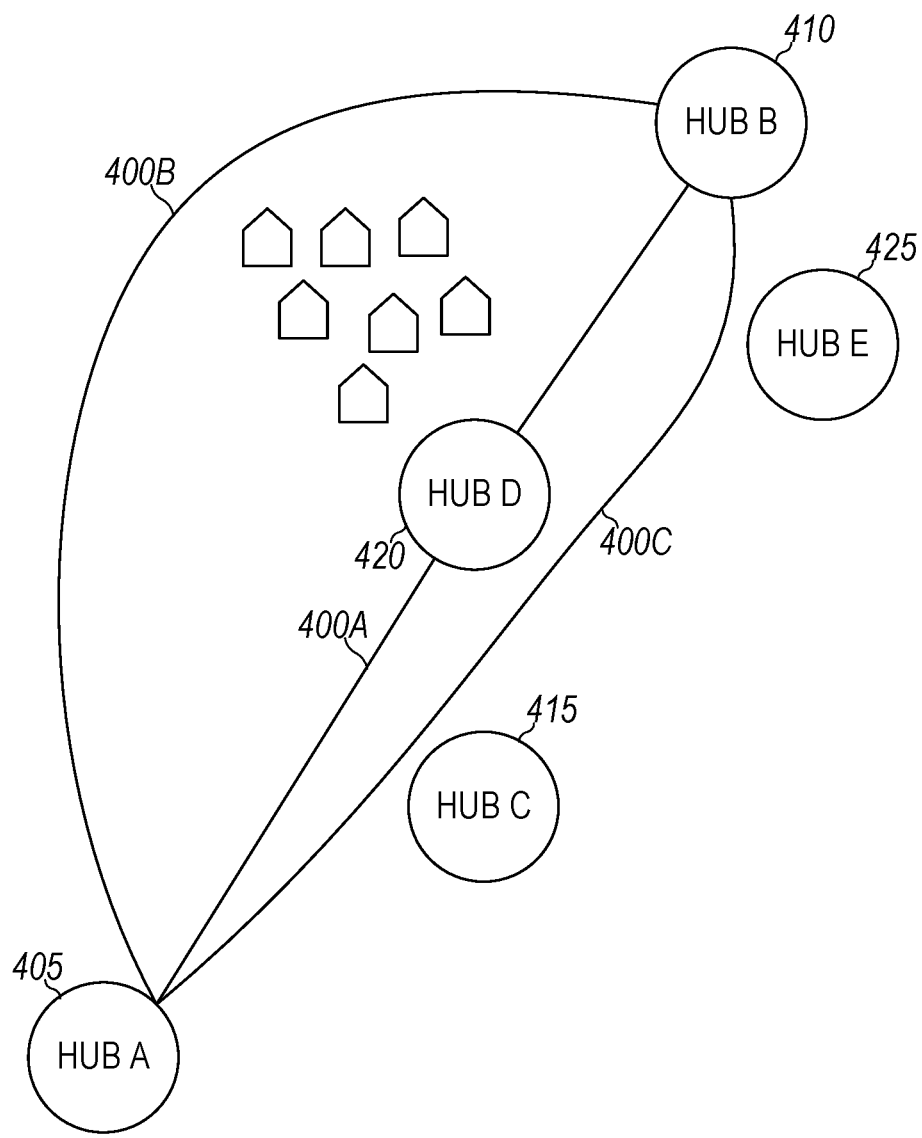
FIG. 4 illustrates candidate routes for optimal VTOL aircraft transport, in accordance with an embodiment.

FIG. 4 illustrates candidate routes for optimal VTOL aircraft transport, in accordance with an embodiment. In the embodiment shown in FIG. 4, the transport network coordination system 215 identifies candidate routes for transport between Hub A 405 and Hub B 410. Each candidate route 400A, 400B, and 400C is calculated based on network and environmental parameters and objectives, such as the presence and location of other VTOL hubs, current locations of other VTOL aircraft 220, planned routes of other VTOL aircraft 220, predetermined acceptable noise levels and current and predicted weather between Hub A 405 and Hub B 410, and localized weather (e.g., sudden downbursts, localized hail, lightening, unsteady wind conditions) in the vicinity of the planned routes. Although three candidate routes are shown in FIG. 4, more or fewer candidate routes may be calculated in other embodiments.

Candidate route 400A represents a direct line of travel between Hub A 405 and Hub B 410 such that candidate route 400A is the shortest of the candidate routes in terms of distance traveled. However, as shown in FIG. 4, candidate route 400A passes over Hub D 420. In one embodiment, therefore, if other VTOL aircraft 220 are taking off and landing at Hub D 420, candidate route 400A might not be selected as the provisioned route for the transport to reduce air traffic congestion at and around Hub D.

As shown in FIG. 4, candidate route 400B would take the VTOL aircraft 220 around a residential area with low predetermined acceptable noise levels to minimize the projection of noise into unwanted areas. However, candidate route 400B represents the longest total distance between Hub A 405 and Hub B 410 and might not be selected as the provisioned route for the VTOL aircraft 220 if other candidate routes that satisfy selected parameters and objectives and have a shorter total distance are available.

Finally, candidate route 400C is a shorter total distance than candidate route 400B and avoids the area of low predetermined acceptable noise level. Further, while candidate route 400C passes near Hub C 415 and Hub E 425, the route does not pass directly over these other VTOL hubs. Therefore, if the selected network and environmental objectives include avoiding areas in which the predetermined acceptable noise level is low, avoiding routes that pass within a threshold distance of one or more VTOL hubs, and/or minimizing the total distance traveled, the candidate route selection module 315 might select candidate route 400C as the preferred route between Hub A 405 and Hub B 410.

Exemplary Routing Method

Figure 5:
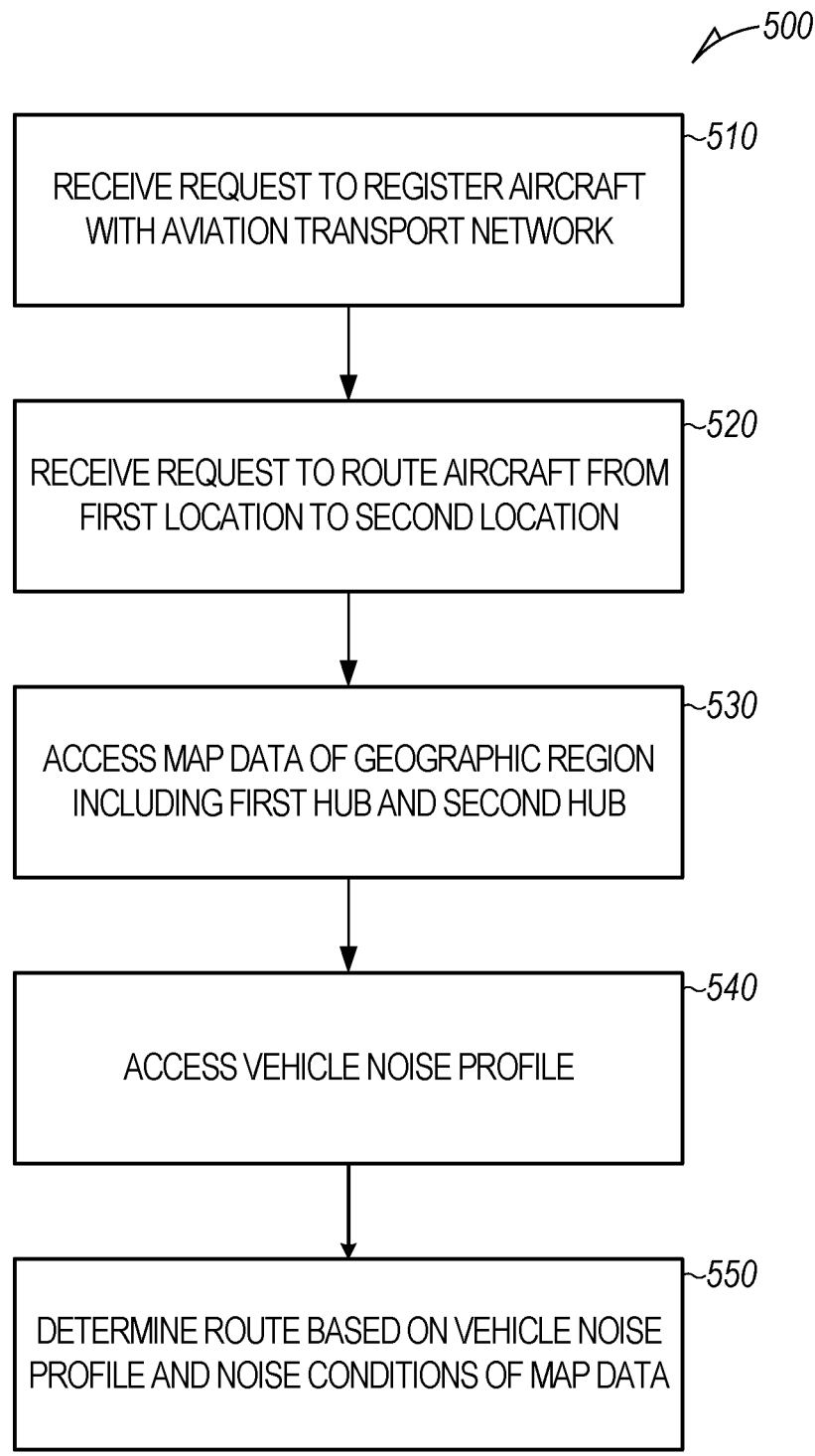
FIG. 5 is a flowchart illustrating a method for dynamic routing of a VTOL aircraft, in accordance with an embodiment.

FIG. 5 illustrates one embodiment of a method 500 for dynamic routing of a VTOL aircraft 220. The steps of FIG. 5 are illustrated from the perspective of the transport network coordination system 215 performing the method 500. However, some or all of the operations may be performed by other entities or components. In addition, some embodiments may perform the operations in parallel, perform the operations in different orders, or perform different operations. In some embodiments, one or more of the functions discussed below with respect to method 800 may be performed by hardware processing circuitry. For example, as discussed below with respect to FIG. 15, instructions 1524 stored in a memory such as 1504 or 1506 may configure one or more processors 1502 to perform one or more of the functions discussed below.

In the embodiment shown in FIG. 5, the method 500 begins with the transport network coordination system 215 receiving, at operation 510, a request from a VTOL aircraft 220 to register the VTOL aircraft 220 with the aviation transport network. The transport network coordination system 215, which is a platform on which multiple carriers and multiple types of VTOL aircraft can operate in an example embodiment, receives the registration request when, for example, a VTOL aircraft 220 goes online and is ready to provide services on the network. The request can include a unique vehicle identification (VID) and data indicative of the vehicle type and/or operator information. The transport network coordination system 215 can also receive, from the VTOL aircraft 220, vehicle state information including the charge level, the maintenance and/or health condition of the VTOL aircraft 220, and the distance to the next service or maintenance event. Additionally or alternatively, the transport network coordination system 215 can receive, from the VTOL aircraft 220, vehicle configuration data including seating capacity and configuration data.

At operation 520, the transport network coordination system 215 receives a request to route the VTOL aircraft 220 from a first location to a second location. In one embodiment, the routing request is generated in response to receiving a request from a user through the client device 240 for transportation from an origin location to a destination location. The transport network coordination system 215 identifies hubs corresponding to the first and second locations, which may define an intermediary leg of the transport from the origin location to the destination location. For example, the transport may include a first leg in which the user is transported from an origin location to a first hub via a first ground-based vehicle or on foot, a second leg in which the user is transported from the first hub to a second hub via a VTOL aircraft 220, and a third leg in which the user is transported from the second hub to a destination location via a second ground-based vehicle or on foot. The transport network coordination system 215 can provide the determined first and second locations to the candidate route selection module 315 for computing candidate routes between the locations.

The data processing module 310 accesses, in operation 530, map data of a geographic region including the first hub and the second hub. Map data for a VTOL aircraft 220 may include data indicative of topology, buildings, flight envelope constraints, and acceptable noise levels or noise constraints. The map data may also be indicative of dynamic real-time information such as current weather in the area, localized weather, current noise levels, ambient noise level, air traffic, etc. Map data may also utilize previous weather, noise, and air traffic data for predictive purposes.

The data processing module 310 also accesses, in operation 540, vehicle noise profile data based on the vehicle data type of the VTOL aircraft 220. In one embodiment, the vehicle noise profile data includes a combination of pre-computed estimates of noise using computational aeroacoustics of the VTOL aircraft 220 in various flight modes. Pressure data in the form of noise hemispheres is generated and propagated to different hypothetical observer locations. This data may also include data gathered from normal operation in different locales, times, and weather conditions. Such data can correspond to the vehicle type, the state of the health and maintenance of the VTOL aircraft 220, and gross weight. Computational analyses and real-time estimates may be verified and validated (both the pressure hemispheres and observed sound) for continued refinement of data and predictive capabilities. The noise profile data may be used to determine one or more estimates of noise levels along a candidate route. For example, for a given speed or engine power level, RPM, ambient moisture/temperature, and a given altitude, the noise profile may determine the estimated noise impact to the geographic area on the ground, surrounding buildings, hubs, and adjacent air vehicles. Additionally or alternatively, the noise profile may receive as input an operational noise level for the VTOL aircraft 220 (the level being selected based on meeting a maximum noise impact), and the noise profile can provide a performance level (including airspeed, altitude, passenger capacity, etc.) that can be used to optimize the routing.

At operation 550, the route selection module 320 determines a route for the VTOL aircraft 220 based on the vehicle noise profile and noise conditions of the map data. The route selection module 320 may determine a route cost for a number of predetermined candidate routes and select the candidate route with the lowest route cost. In one embodiment, route cost may be a function of distance, energy, cost, time, noise, observer annoyance, etc. Due to the temporal nature of the data utilized for optimization, the route selection module 320 may use Kalman filtering and/or predictive neural nets to filter and weight inputs and constraints to the VTOL routing algorithm. In one embodiment, candidate routes meet minimum acceptable or optimal criteria for flight. These paths may be visualized as convex hulls around the VTOL aircraft 220 itself and the interaction of this separation space with adjacent hulls (e.g., due to other vehicles or infrastructure) as a way to geometrically compute and visualize relevant or available routes. Optimization methods may be checked for continuity to ensure that generated routes meet realizable speed and maneuverability targets of operating vehicles. Relative vehicle information (e.g., position, velocity, state-of-charge) is also utilized to understand first-order effects of other aircraft within the vicinity of the VTOL aircraft 220.

Figure 6:
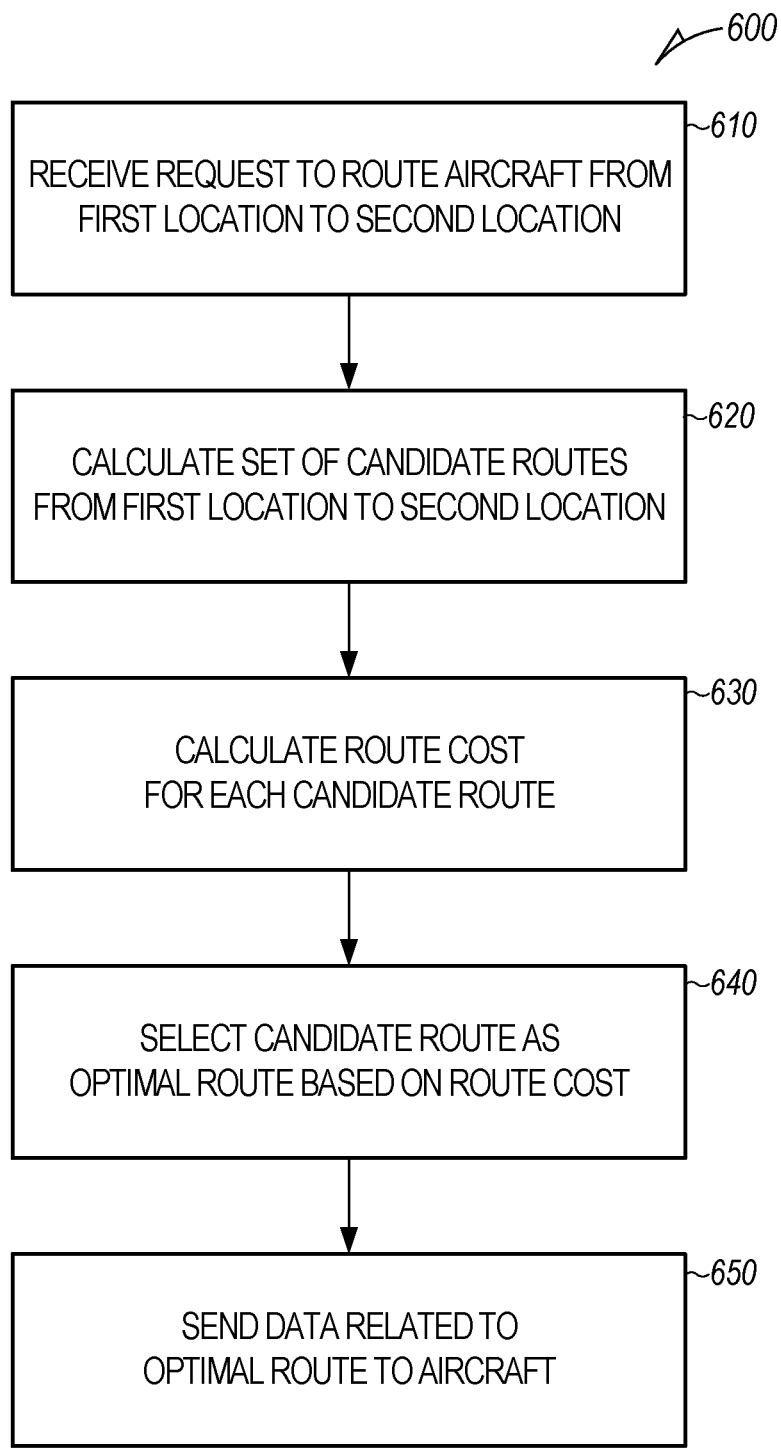
FIG. 6 is a flowchart illustrating a method for determining a route from a first VTOL aircraft hub to a second VTOL aircraft hub, in accordance with an embodiment.

FIG. 6 illustrates one embodiment of a method 600 for determining a route from a first VTOL aircraft hub to a second VTOL aircraft hub. The operations of FIG. 6 are illustrated from the perspective of the transport network coordination system 215 performing the method 600. In some embodiments, one or more of the functions discussed below with respect to method 600 may be performed by hardware processing circuitry. For example, as discussed below with respect to FIG. 15, instructions 1524 stored in a memory such as 1504 or 1506 may configure one or more processors 1502 to perform one or more of the functions discussed below. However, some or all of the operations may be performed by other entities or components. In addition, some embodiments may perform the operations in parallel, perform the operations in different orders, or perform different operations.

In the embodiment shown in FIG. 6, the method 600 begins with the transport network coordination system 215 receiving, in operation 610, a request to route a VTOL aircraft 220 from a first location to a second location. In one embodiment, the routing request is generated in response to receiving at least one request from a user through a client device 240 for transportation from an origin location to a destination location. The transportation from the origin location to the destination location may include a first leg during which a first ground-based vehicle transports the user from the origin location to the first location (e.g., a first VTOL hub), a second leg during which a VTOL aircraft 220 transports the user from the first location to a second location (e.g., a second VTOL hub), and a third leg during which a second ground-based vehicle transports the user from the second location to the destination location.

At operation 620, the candidate route selection module 315 calculates a set of candidate routes from the first location to the second location (e.g., for the second leg of the trip). In one embodiment, the candidate route selection module 315 computes different routes between the first location and the second location that each optimizes for a different network or environmental parameters, such as predetermined acceptable noise levels, the locations of other VTOL aircraft 220 and VTOL hubs, weather, predicted travel time, and the like. Alternatively, candidate routes may be manually selected (e.g., by selecting a series of waypoints between the first location and the second location).

For each candidate route in the set of candidate routes, the route selection module 320 calculates a route cost in operation 630. In one embodiment, the route cost is a function of the network and/or environmental factors, such as the distance of the route, the anticipated amount of energy required to transport the VTOL aircraft 220 along the route, the cost to transport the VTOL aircraft 220 along the route, and the like.

In some embodiments, the route selection module 320 selects a first candidate route with the lowest route cost and determines a noise profile for the route. If the route selection module 320 determines that the noise profile for the first candidate route is at or below an acceptable noise profile threshold, the route selection module 320 selects, in operation 640, the route as the provisioned route for the VTOL aircraft 220. Alternatively, if the route selection module 320 determines that the noise profile for the first candidate route exceeds the acceptable noise profile threshold, the route selection module 320 discards the first candidate route and calculates a noise profile for the candidate route with the second lowest route cost. The route selection module 320 continues to calculate noise profiles for candidate routes until the route selection module 320 identifies a candidate route with a noise profile below the noise profile threshold. Responsive to selecting a candidate route as the provisioned route for the VTOL aircraft 220, the route selection module 320 sends data related to the provisioned route to the VTOL aircraft 220 in operation 650.

Figure 7:
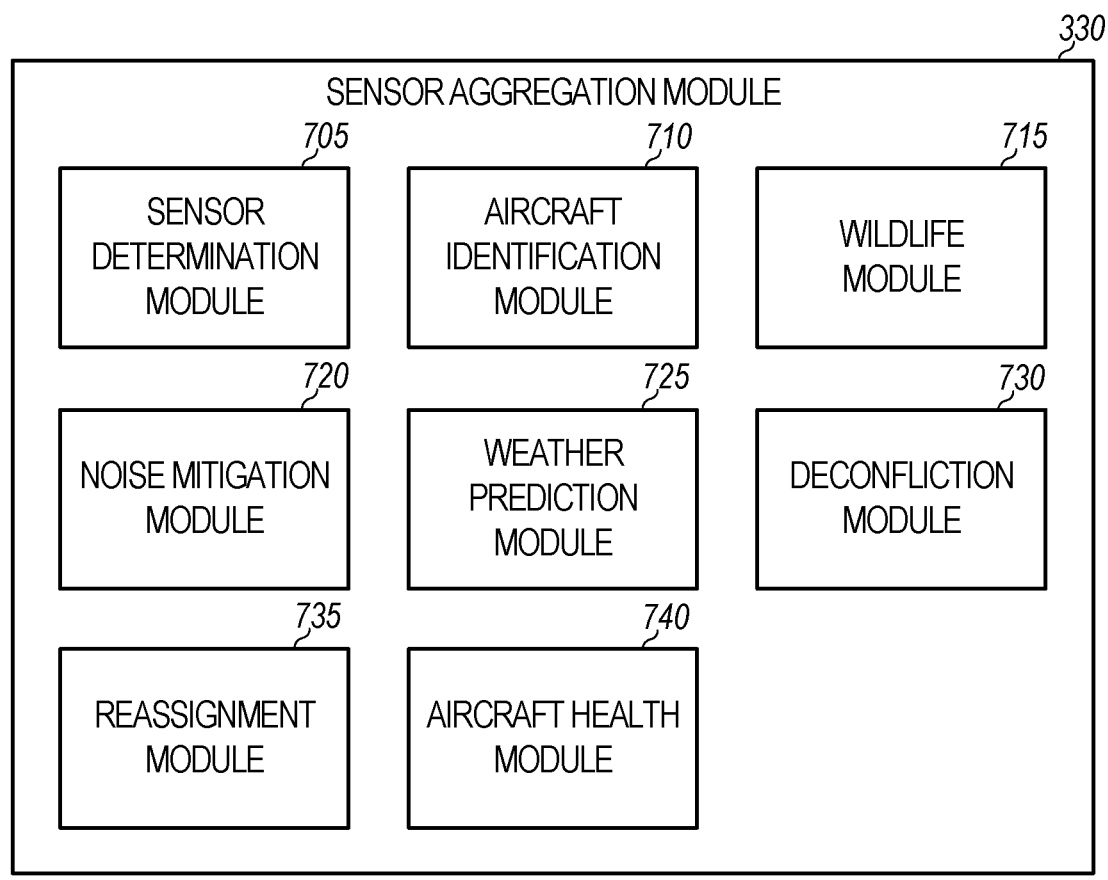
FIG. 7 illustrates one embodiment of the sensor aggregation module shown in FIG. 3.

FIG. 7 illustrates one embodiment of the sensor aggregation module 330 shown in FIG. 3. In the embodiment shown in FIG. 7, the sensor aggregation module 330 includes a sensor determination module 705, an aircraft identification module 710, a wildlife module 715, a noise mitigation module 720, a weather prediction module 725, a deconfliction module 730, a reassignment module 735, and an aircraft health module 740. In other embodiments, the sensor aggregation module 330 may include different and/or additional elements. Furthermore, the functionality may be distributed between components in manners different than described.

It can be desirable that a vertiport remains aware of its noise impact and other environmental conditions. Noise and other data may be collected and aggregated by the sensor determination module 705 to enable the performance of noise mitigation and other vertiport management functions. In one embodiment, sensors are affixed or physically integrated at the vertiport and/or data is gathered on an ad-hoc basis via microphones and/or other sensors within a geographic vicinity of the vertiport. The sensors may also be fixed to ground based infrastructure, ground vehicles, air vehicles, and/or user devices (e.g., smart phones). The sensors send collected data to the sensor determination module 705 (e.g., via the network 270).

At any given time, a data collection radius around the vertiport may be defined to determine which sensors to use for data collection relevant to the vertiport. In the case of noise collectors (e.g., microphones), the sensors may receive a signal to turn on (if not already on) and then begin collecting noise data. This data may be processed onboard the collector initially to filter out irrelevant or irregular noise patterns before sending to the network. At the network level, additional processing may occur to generate a location-based noise or perception map which can then be made available to the vertiport to help with operational or airspace related decision-making.

Previously collected noise data may also be utilized for smart-filtering. An understanding of temporally regular events may be used to determine whether data collection should be more or less frequent. Moreover, predicted perceived noise levels or computed acoustics due to aircraft trajectories can be utilized to better select noise collectors for adequate sampling quality and size. Throughout a day, the data collection radius may be dynamically scaled to ensure that noise perception levels are not exceeded in and around the vertiport while also balancing computing resources.

A distributed sensing array can be composed of sonic, ultrasonic, passive IR, LIDAR, lighting, barometric, humidity, temperature, camera, and radar systems spread across various communication bands and in different quantities to support a variety of use cases. Each sensor array can come equipped with adequate actuators, cleaning jets/sprays, wipers, and the like to provide continued operation in different environments and weather situations. Various use cases for sensor data are described below, with continued reference to FIG. 7.

In day-to-day operations, it may be desirable that vertiports and any related airspace management system can identify aircraft in operation. While much of this identification can be facilitated via backend protocols, in some embodiments, physical identification and confirmation of the aircraft assets may be desirable. In one embodiment, the aircraft ID module 710 receives one or more of photo, IR, LIDAR, multispectral, or radar data. The aircraft ID module 710 processes the data to identify and track aircraft. These observations may be of the aircraft itself or artifacts of aircraft flight (e.g. photo capture of wingtip vortices characteristic of a certain aircraft type or LIDAR moisture measurements in the wake of an aircraft's flight path).

The wildlife module 715 uses one or more of multispectral sensors, IR, radar, cameras, and microphones to sense ground and air wildlife. The synthesis of sensor data from more than one source may assist in the correct identification of the type of wildlife and determine a proper response. If the wildlife can be correctly identified, adequate responses in the form of light or sound can be transmitted to the observed wildlife for their safety and to prevent vertiport interference. The transmitted response can be tailored to the wildlife's aural and visual capabilities. Keeping wildlife away from the vertiport vicinity may reduce the chances of the wildlife being harmed inadvertently. This also reduces the likelihood of aircraft, sensing, and infrastructure assets being negatively affected by direct or indirect effects of wildlife proximity, such as habitation or waste.

Successful day-to-day operations may include managing a noise profile at and around vertiports for community acceptance. The microphones and speakers included in a distributed sensing array may enable vertiports to quantify their noise impact at and around the vicinity. In one embodiment, the noise mitigation module 720 quantifies the impact of the vertiport on noise levels and compares a current noise signature with predicted and threshold noise signatures to act accordingly. The noise mitigation module 720 may take corrective action to reduce noise levels, such as limiting landing and takeoff for aircraft meeting a specific signature threshold. This can also result in commands or constraints conveyed from the network to the aircraft system to mitigate noise signature by specific methods such as slowing down propellers or activating different control surfaces or more generalized methods like approach, departure, and transition directions.

The weather prediction module 725 characterizes the weather and microclimates around vertiports. This may assist with safe and efficient VTOL (e.g., eVTOL) and UAV operation. In dense urban environments, a sudden change in weather conditions can result in wind conditions which may significantly alter the way aircraft land and depart from vertiports. In one embodiment, weather data can be gathered via temperature, barometric, LIDAR (moisture monitoring), and radar data (S or X band). Changes in weather may additionally or alternatively be indirectly calculated based on perceived changes in IR or multispectral data from aircraft. This indirect delta may take into account the aircraft's routing history, age, and temporal effects.

The weather prediction module 725 may monitor ground effect and gusts at final approaches and take offs (FATOs) and touchdowns and liftoffs (TLOFs). Using sensors to characterize velocity and pressure fields close to the ground plane which can then be compared to predictive characterizations of the vertiport may help schedule vehicle takeoffs and landings and reduce the likelihood of failure mode realization.

Some cities may have multiple operators of VTOL flights to meet different city needs. In one embodiment, the deconfliction module 730 uses data from sensor arrays to identify aircraft from these other operators (e.g., if their systems are uncommunicative or their vehicles go rogue). Combined with onboard sensors from aircraft, the vertiport sensing array data can feed data to the airspace management tool and network to determine various options for deconfliction.

Depending on the combination of vertiport layout, weather conditions, wildlife concerns, and airspace environment, in some embodiments, a FATO area previously allocated for landing can be switched for takeoffs and vice versa. In one embodiment, the reassignment module 735 uses data gathered from a distributed sensing array to make a determination of whether the FATO purpose be reassigned and to provide instructions accordingly to human operators, hub management systems 230, and/or VTOLs 220.

Sensor data can also provide insights into the health and state of a VTOL 220. In one embodiment, the aircraft health module 740 receives recordings of, for example, propeller rotations, multispectral imagery of composite structures, and/or IR imagery of aircraft approaching and departing the vertiport. The recordings can be compared to a 'digital twin' of the aircraft to identify potential problems. Over time, this can be used for correlative analysis and root cause determination for failures. This data can also help route vehicles at the right time to maintenance depots for inspection and tuning. Moreover, closer to inspection periods, this can help inform how vehicles are placed and located to minimize their geographic distance to the depots themselves.

Additionally, aircraft may be programmed to emit specific noises to indicate the state of its health. Speakers strategically placed at parking pads or in the TLOF or FATO can be programmed to actively seek these signals for proper maintenance or operational actions to take place.

Takeoff and landing in urban environments may be difficult due to unwanted gusts, wind patterns, and abrupt changes in weather. In a network utilizing a non-homogenous fleet, some vehicles may have better controllability in these uncertain weather conditions when compared to others. In embodiments where there are various dedicated sensors to collect weather data (e.g., mobile and fixed data collectors) as well as weather data available, the network may optimize and reprioritize the allocation of aircraft such that a vertiport expecting or experiencing tricky weather conditions will send and receive aircraft that will be able to land in those weather conditions. The data to ground these decisions may include wind speed, air pressure, temperature, moisture, and the like. This may happen on a trip by trip basis or be extended to combinations of trips so that vehicles with more limited controllability envelopes are biased towards operating in vertiports with more favorable weather conditions.

Figure 8:
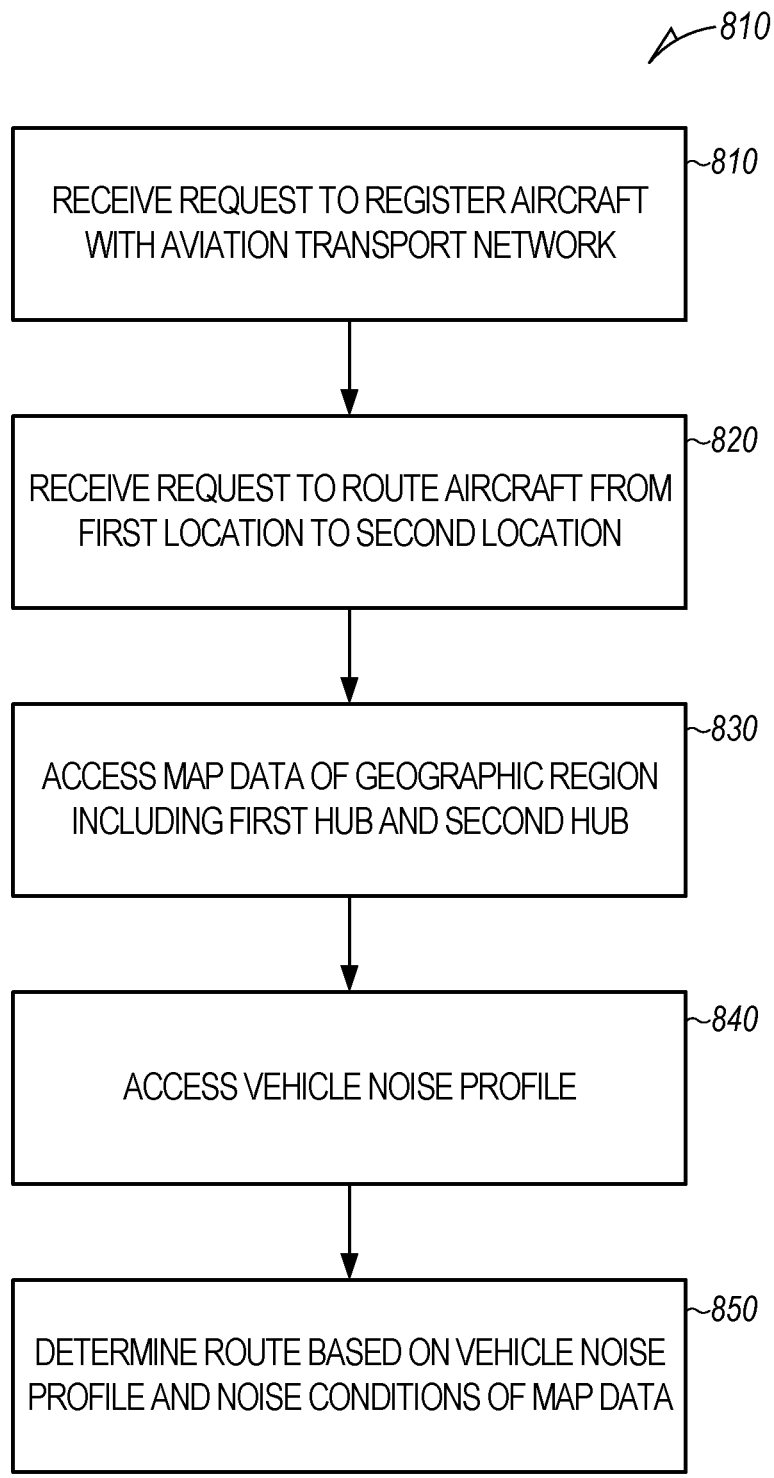
FIG. 8 illustrates one embodiment of a method for dynamic routing of a VTOL aircraft.

FIG. 8 illustrates another embodiment of a method 800 for dynamic routing of a VTOL aircraft 220. In some embodiments, one or more of the functions discussed below with respect to the method 800 may be performed by hardware processing circuitry. For example, as discussed below with respect to FIG. 15, instructions 1524 stored in a memory such as 1504 or 1506 may configure one or more processors 1502 to perform one or more of the functions discussed below. The operations of FIG. 8 are illustrated from the perspective of the transport network coordination system 215 performing the method 800. However, some or all of the operations may be performed by other entities or components. In addition, some embodiments may perform the operations in parallel, perform the operations in different orders, or perform different operations.

In the embodiment shown in FIG. 8, the method 800 begins with the transport network coordination system 215 receiving, in operation 810, a request from a VTOL aircraft 220 to register the aircraft 220 with the aviation transport network. The transport network coordination system 215, which is a platform on which multiple carriers and multiple types of VTOL aircraft can operate in an example embodiment, receives the registration request when, for example, a VTOL aircraft 220 goes online and is ready to provide services on the network. The request can include a unique vehicle identification (VID) and data indicative of the vehicle type and/or operator information. The transport network coordination system 215 can also receive, from the VTOL aircraft 220, vehicle state information including the charge level, the maintenance and/or health condition of the VTOL aircraft 220, and the distance to the next service or maintenance event. Additionally or alternatively, the transport network coordination system 215 can receive, from the VTOL aircraft 220, vehicle configuration data including seating capacity and configuration data.

At operation 820, the transport network coordination system 215 receives a request to route the VTOL aircraft 220 from a first location to a second location. In one embodiment, the routing request is generated in response to receiving a request from a user through a client device 240 for transportation from an origin location to a destination location. The transport network coordination system 215 identifies hubs corresponding to the first and second locations, which define an intermediary leg of the transport from the origin location to the destination location. The transport network coordination system 215 provides the determined first and second locations to the candidate route selection module 315 for computing candidate routes between the locations.

The data processing module 310 accesses, at operation 830, map data of a geographic region including the first hub and the second hub. Map data for a VTOL aircraft 220 may include data indicative of topology, buildings, flight envelope constraints, and acceptable noise levels or noise constraints. The map data may also be indicative of dynamic real-time information such as weather, current noise levels, ambient noise level, air traffic, etc. Map data may also utilize previous weather, noise, and air traffic data for predictive purposes.

The data processing module 310 also accesses, at operation 840, vehicle noise profile data based on the vehicle data type of the VTOL aircraft 220. In one embodiment, the vehicle noise profile data includes a combination of pre-computed estimates of noise using computational aeroacoustics of the VTOL aircraft 220 in various flight modes. Pressure data in the form of noise hemispheres is generated and propagated to different hypothetical observer locations. This data may also include data gathered from normal operation in different locales, times, and weather conditions. Such data can correspond to the vehicle type, the state of the health and maintenance of the VTOL aircraft 220, and gross weight. Computational analyses and real-time estimates may be verified and validated (both the pressure hemispheres and observed sound) for continued refinement of data and predictive capabilities. The noise profile data may be used to determine one or more estimates of noise levels along a candidate route. For example, for a given speed or engine power level, RPM, ambient moisture/temperature, and a given altitude, the noise profile may determine the estimated noise impact to the geographic area on the ground, surrounding buildings, hubs, and adjacent air vehicles. Additionally or alternatively, the noise profile may receive, as input, an operational noise level for the VTOL aircraft 220 (the level being selected based on meeting a maximum noise impact), and the noise profile can provide a performance level (including airspeed, altitude, passenger capacity, etc.) that can be used to optimize the routing.

At operation 850, the route selection module 320 determines a route for the VTOL aircraft 220 based on the vehicle noise profile and noise conditions of the map data. The route selection module 320 may determine a route cost for a number of predetermined flight corridors and select the corridor with the lowest route cost. In example embodiments, route cost may be a function of distance, energy, cost, time, noise, observer annoyance, etc. Due to the temporal nature of the data utilized for optimization, the route selection module 320 may use Kalman filtering and/or predictive neural nets to filter and weight inputs and constraints to the VTOL routing algorithm. In one embodiment, candidate routes meet minimum acceptable or optimal criteria for flight. These paths or routes may be visualized as convex hulls around the VTOL aircraft 220 itself and the interaction of this separation space with adjacent hulls (due to other vehicles, infrastructure, etc.) as a way to geometrically compute and visualize relevant or available routes. Optimization methods may be checked for continuity to ensure that generated routes meet realizable speed and maneuverability targets of operating vehicles. Relative vehicle information (e.g., position, velocity, state-of-charge) is also utilized to understand first-order effects of other aircraft within the vicinity of the VTOL aircraft 220.

Figure 9:
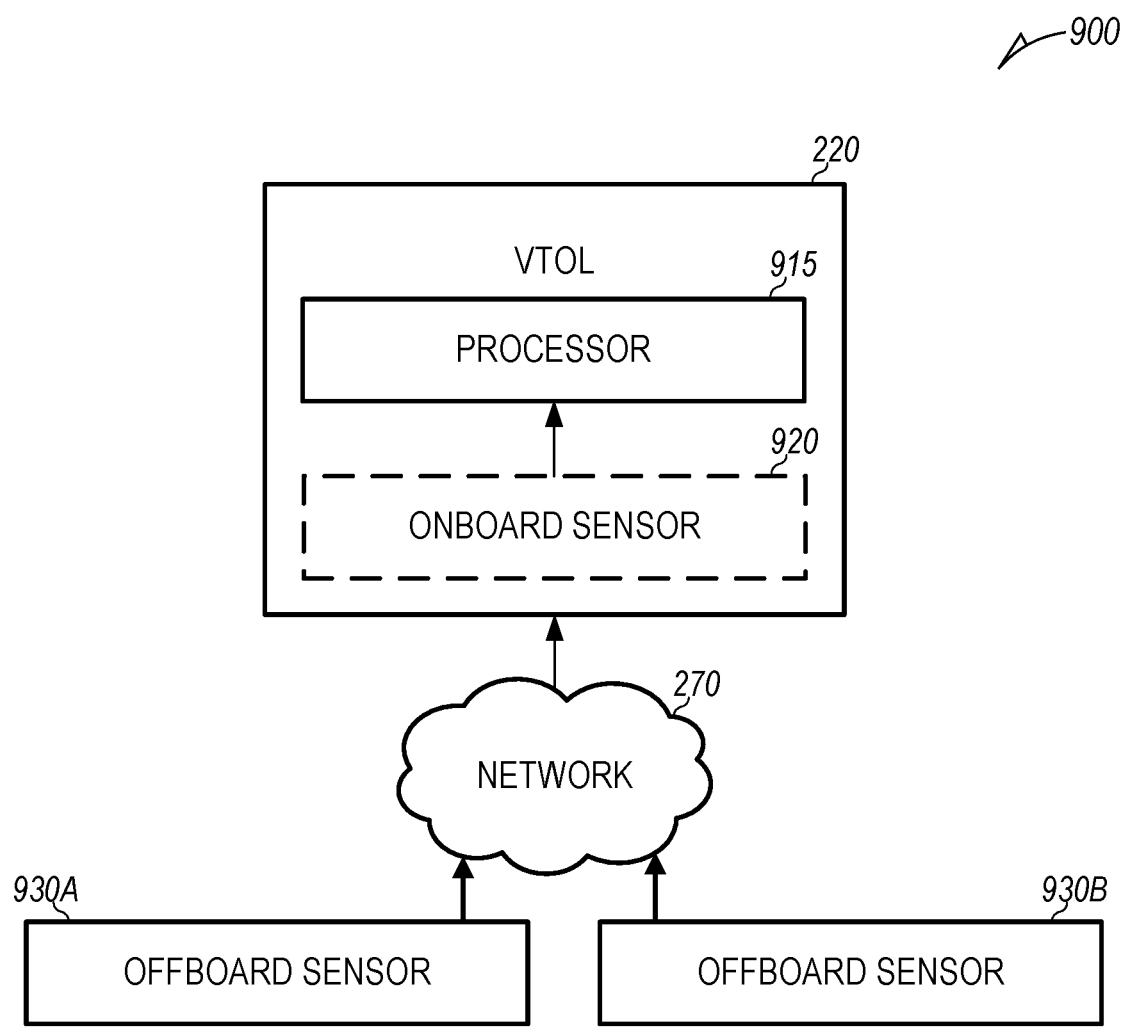
FIG. 9 is a system diagram showing an embodiment using offboard sensor data for noise mitigation.

FIG. 9 is a system diagram showing an embodiment using offboard sensor data for noise mitigation. In the embodiment shown in FIG. 9, a VTOL aircraft 220 is communicatively coupled to one or more offboard sensors 930 via a network 270. The one or more offboard sensors 930 are configured to collect noise data and provide the noise data to the computer system (e.g., controller 915) of the VTOL aircraft 220 for processing. For example, in one embodiment, a first offboard sensor is at location D and a second offboard sensor is at location E, where location D is the starting vertiport location and location E is the ending vertiport location.

In addition, the VTOL aircraft 220 may include one or more onboard sensors 920. The one or more onboard sensors 920 collect operational data of the VTOL aircraft 220, including noise data, and provide the operational data to the computer system for processing. Onboard sensors 920 may additionally or alternatively be configured to measure other operational data such as speed and direction of the VTOL aircraft 220.

In some embodiments, the noise data includes a timestamp that indicates the time at which the noise data was acquired. The noise data may include location data (e.g., GPS coordinates) that indicates a location at which the noise data was acquired. Fidelity of the noise data may be determined at the network level or at the VTOL aircraft 220 level. For example, at the network level, the fidelity of the noise data is determined by the data processing module 710. At the VTOL aircraft 220 level, the fidelity of the noise data is determined by a processor 915.

In some embodiments, a machine learning (ML) model is trained using a training set of noise data. The ML model is configured to generate predictive temporal data for noise signature mitigation. In other words, the ML model predicts future noise signatures based on current sensor data. This may be used to modify VTOL routing to reduce environmental noise impacts. For example, the VTOL aircraft 220 may modify its route to avoid flying over geographic areas for which the predicted noise level exceeds a threshold. The ML model may be part of the data processing module 310, with updated routing information being provided to the VTOL aircraft 220 by the route selection module 320. Alternatively, route modifications may be determined at the VTOL aircraft 220 (e.g., by the processor 915).

In the embodiment shown in FIG. 9, the VTOL aircraft 220 includes a computer system, as described above with reference to FIG. 2. The computer system includes the processor 915 for processing the received noise data. The VTOL aircraft 220 flies at a speed v in a direction x. The processor 915 performs a matrix multiplication between a noise gain vector and a VTOL vector representing a controllability assessment of the VTOL aircraft 220. The noise gain vector defines the noise signature that would like to be achieved. The VTOL vector is a controllability assessment of the vehicle. In other words, the state vector describes the status of the VTOL aircraft 220 and various ones of its systems and subsystems. The matrix product is sent from the VTOL aircraft 220 to the transport network coordination system 215 via the network 270. Alternatively, in some embodiments, the VTOL aircraft 220 sends the VTOL vector to the transport coordination system 215 which performs the matrix multiplication (e.g., at the data processing module 310).

Based on the matrix product, the VTOL aircraft 220 may make adjustments to the way it is flying to reduce environmental impact. In some embodiments, the VTOL aircraft 220 further includes a controller (not shown in FIG. 9) for controlling various components of the VTOL aircraft 220. For example, the controller changes translative speed, propeller speed, or choices in propulsor usage (e.g., a quiet propulsor vs. a high thrust, noisy propulsor) to modify the noise profile in the vicinity of the VTOL aircraft 220.

Alternatively or additionally, noise mitigation actions may be decided at the network level to balance concerns across a city and relieve computing constraints on the aircraft. For example, the route selection module 320 of the transport network coordination system 215 may determine that the route or operational parameters (e.g., propeller speed) of a VTOL aircraft 220 should be updated in view of the determined noise profile based on operations of multiple VTOL aircraft. The route selection module 320 may send updated routing instructions to one or more of the VTOL aircraft 220 via the network 270.

Figure 10:
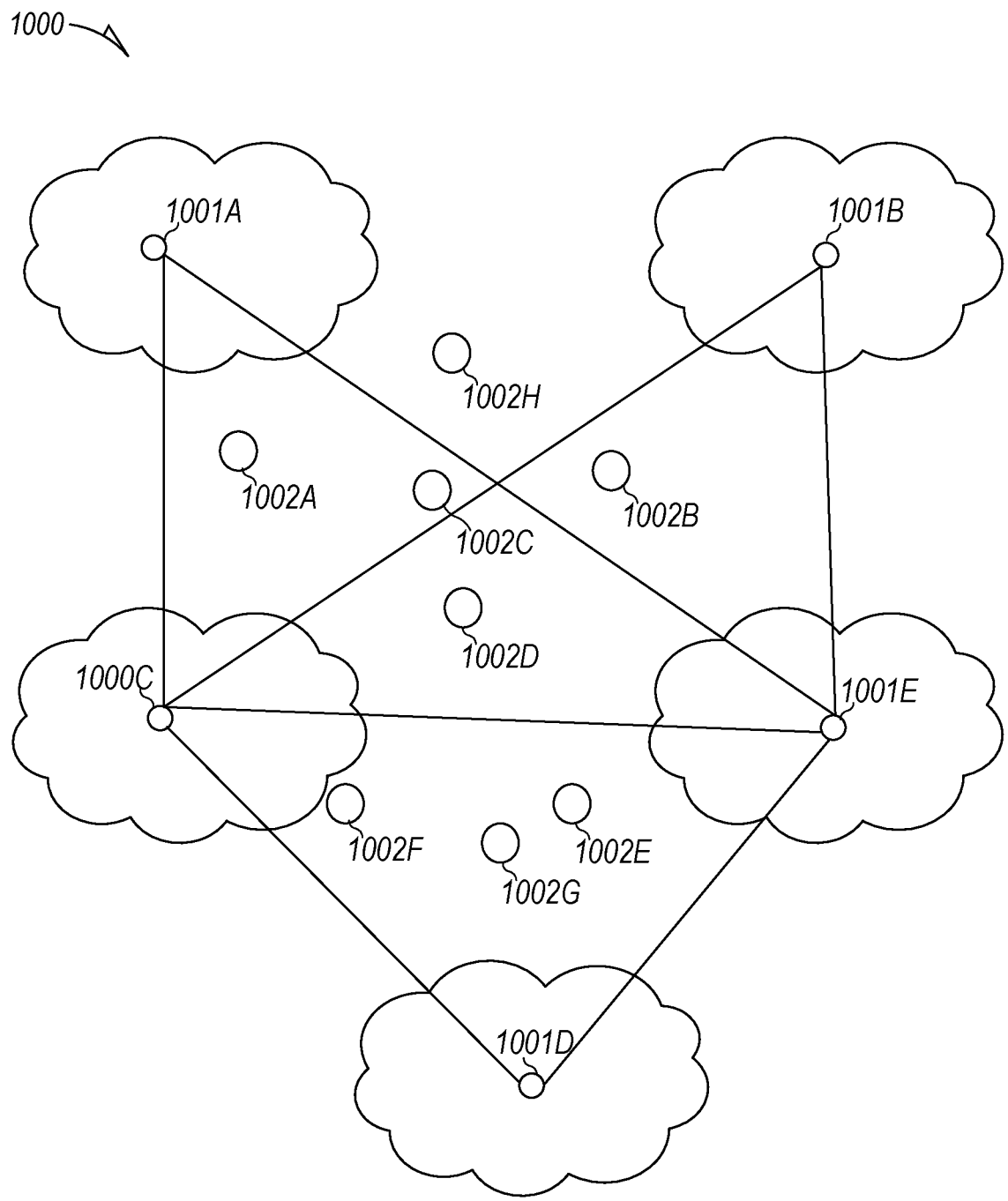

Referring to FIG. 10, a network of vertiports is defined with nodes labeled 1001a-e and flights between nodes denoted by connecting lines, according to one embodiment. Noise collectors exist across the geographic area and are denoted by nodes 1002A-H. The noise collectors may be fixed or mobile. The noise signature of each vertiport is defined by non-convex polygons surrounding each node. Node B 1002B is surrounded by two such non-convex polygons to represent a potential alteration of its noise signature. The noise signature can be computed regularly using a composite of distributed noise measurements.

The noise in the urban environment may be affected due to urban air mobility. Flights in and around vertiports may change perceived noise levels and it may be desirable to manage these impacts to observers at the vertiport level. The noise signature of a vertiport may be managed via one or more techniques. Example techniques, which may be used alone or in combination, are described below.

In one embodiment, the overall vertiport throughput may be increased or decreased dynamically. The perceived noise level in and around the vertiport is a function of the amount of trips occurring in and around the vertiport. If the vertiport noise signature cannot be mitigated by the control of vehicles or selection of operating vehicles alone, overall throughput at the vertiport may be modified for more or less trips.

In another embodiment, the vehicles routed to the vertiport are filtered based on their noise impact. Depending on current perceived noise levels, vehicles may be allowed or disallowed from landing and taking-off based on vehicle predicted operating noise signatures. When a vertiport is closer to threshold perceived noise levels, routing of quieter vehicles to and from that vertiport may become more frequent.

In a further embodiment, the approach and departure pathways for a vertiport may be changed to manage the vertiport's noise profile. Once vehicles have been selected for optimal takeoff and landing, their routing may be modified such that they do not fly over places with higher sensitivity to perceived noise. Vehicle speeds and/or rates of climb may also be adjusted to manage the vertiport's noise profile. Once a path for a vehicle has been decided, the perceived noise level impact of the vehicle (which contributes to the overall noise signature of the vertiport) can be modified by altering a vehicle's speed and/or rate of climb/descent. This is because an aircraft's noise signature is a function of its pressure delta on the ambient environment which is controlled by how much it actively disturbs the air.

One approach to achieving ultra-high aircraft throughput is to organize flows of air traffic into a set of "skylanes" or flight paths along which aircraft are typically routed but that may change to accommodate changing demand patterns, weather, airspace restrictions, or other dynamic considerations. This dynamic, optimized network of flight paths provide many advantages and benefits. Because pre-planned route networks are a component for flight planning, the optimized network can provide a direct instantiation of a route planning function. Additionally, the optimized network can be planned using a combination of considerations that do not need to be known or reanalyzed for each new flight request. The considerations can include, for example, distance from origin to destination, noise sensitivity along a flight path, distance to a backup landing site, separation from traditional air traffic (e.g., arrival and departure flow at airports), and avoiding terminal airspace. Furthermore, the optimized network improves integration with air traffic control (ATC) by providing insight into intentions of aircraft using the optimized network and allow the ATC to determine if these aircraft are not in conformance, and simplifies aircraft tracking, trajectory prediction, intent inference, conflict detection and resolution, and other airspace services and functional requirements.

Figure 11A:
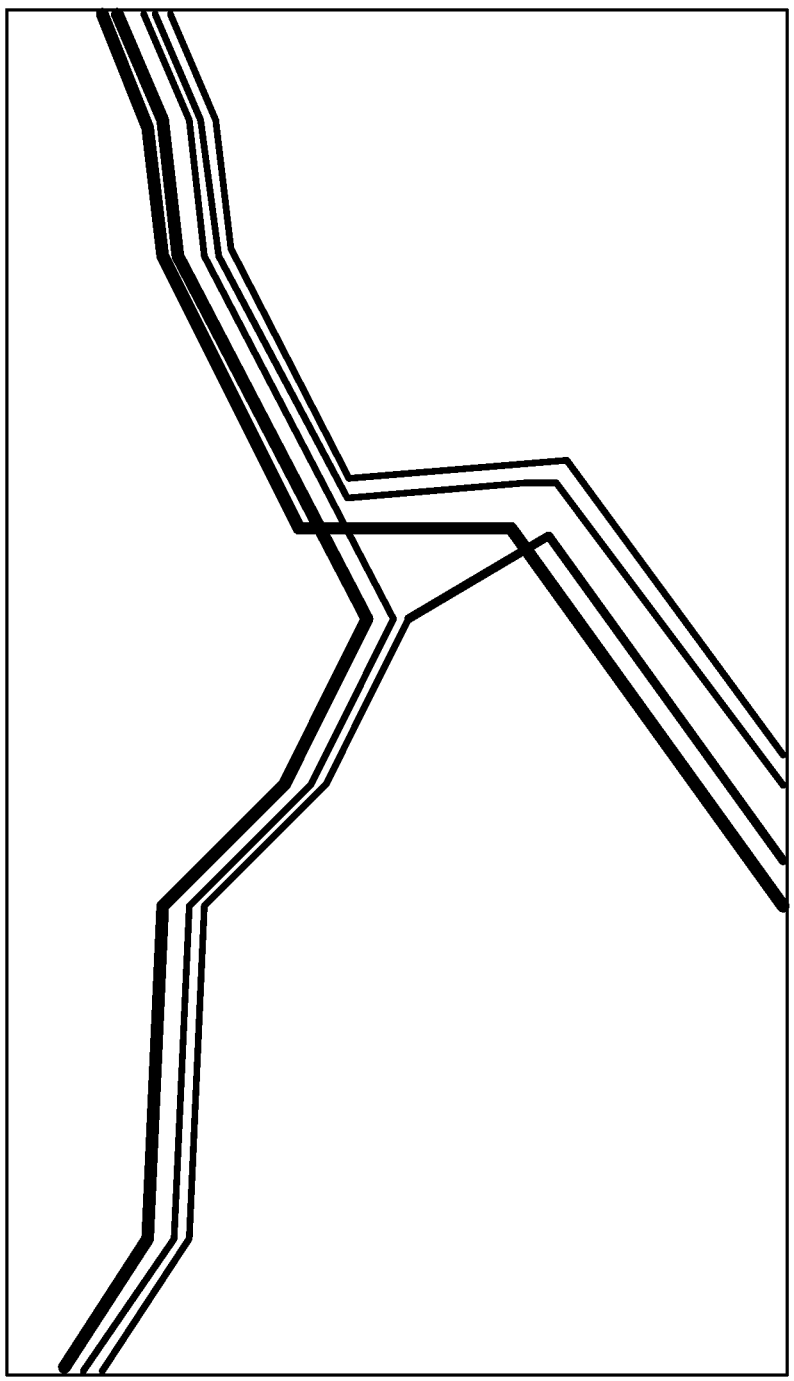
FIG. 11A shows an example dynamic network of skylanes.
Figure 11B:
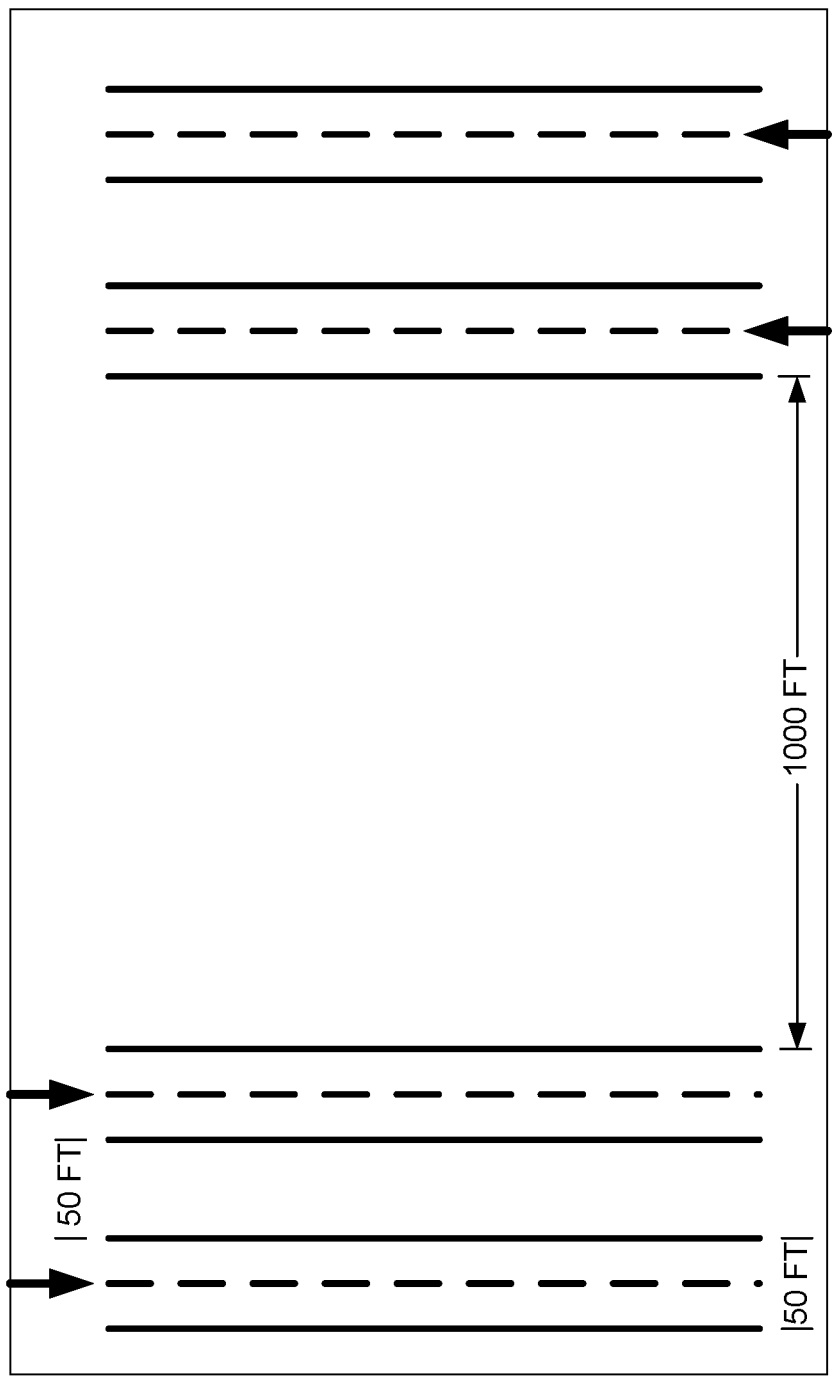
FIG. 11B shows an example skylane layout.

An example of an optimized network of flight paths or skylanes is shown in FIG. 11A and an example skylane layout is shown in FIG. 11B. Because skylanes (shown as lines in FIG. 11A) are designated at different altitudes, the skylanes can cross over each other as shown in FIG. 11A. Additionally, aircraft can transition from one skylane to another skylane. Skylanes can be generated to accommodate one or more aircraft in one or more directions. In one embodiment, skylanes going in the same direction at a same altitude are positioned a minimum distance (e.g., 50 feet) apart from each other. Additionally, skylanes traveling in opposite directions at the same altitude are positioned a minimum distance (e.g., 1000 feet) apart from as shown in FIG. 11B. In one embodiment, more skylanes can be added in one direction during higher demand times (e.g., by reducing skylanes in the opposite direction).

Example embodiments are directed to generating an optimized network of skylanes and an operations volume around each of these skylanes in which an aircraft should operate. A network system (e.g., a transport network coordination system) creates a source network of paths, whereby the source network comprises a set of possible paths between two locations. The network system assigns a cost for traversing each edge of each path of the source network and aggregates the cost for traversing each edge of each path to obtain a cost for each path of the source network. Based on the cost for each path, the network system identifies a path having the lowest cost, whereby the path having the lowest cost is the optimized route between the two locations. The network system then generates an operations volume for the optimized route. The operations volume represents airspace surrounding the optimized route. The operations volume is transmitted to a further system for use. As such, example embodiments provide the technical effect of optimizing flight planning and optimizing flight paths.

Figure 12:
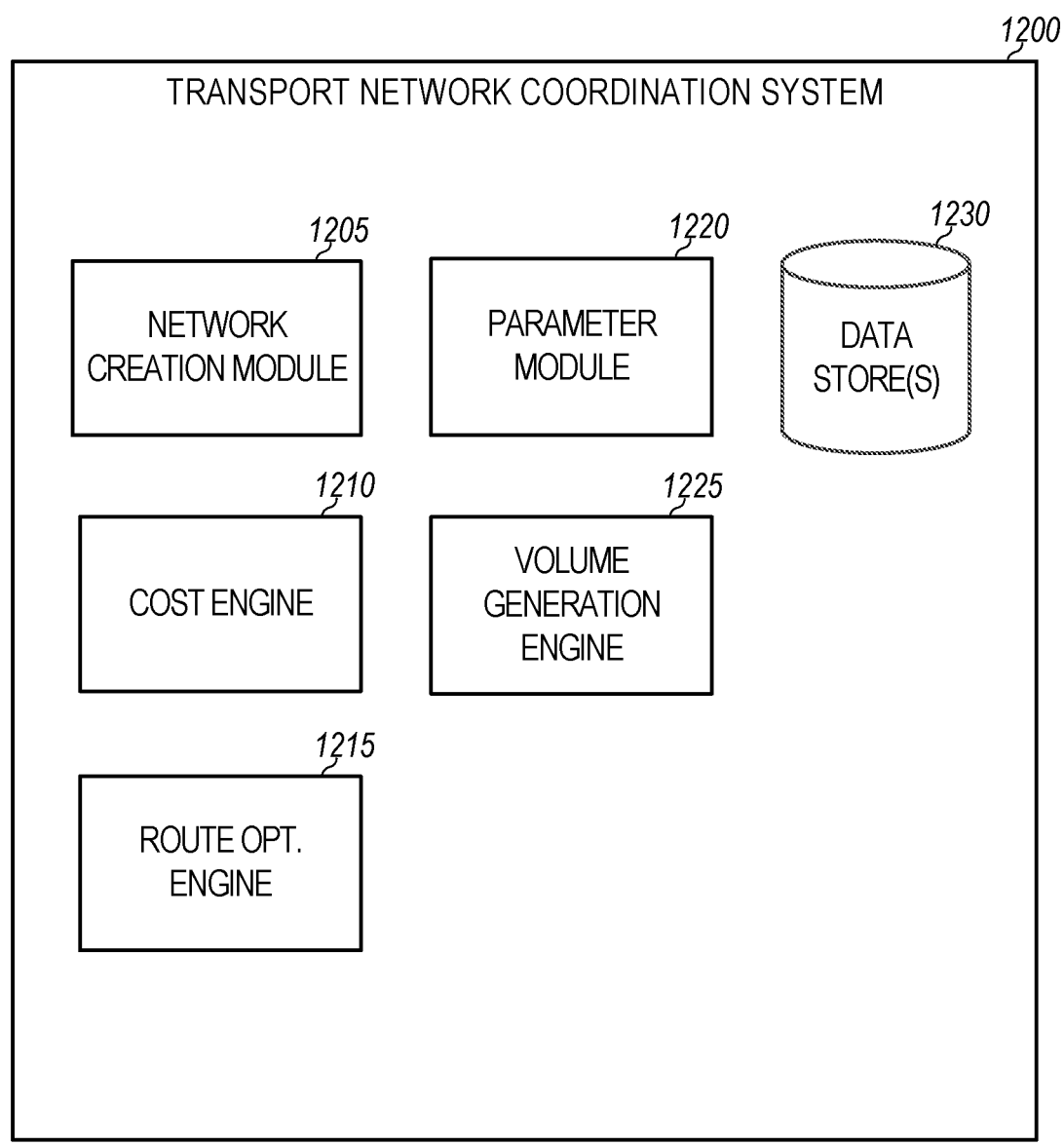
FIG. 12 is a high-level block diagram illustrating an alternative transport network coordination system, in accordance with an embodiment.

FIG. 12 is a high-level block diagram illustrating an alternative transport network coordination system 1200, in accordance with an embodiment. The transport network coordination system 1200 is configured to generate the optimized network of flight paths or skylanes and to generate an operations volume (e.g., three or four-dimensional volume) around each of these flight paths. To enable these operations, the transport network coordination system 1200 comprises a network creation module 1205, a cost engine 1210, a route optimization engine 1215, a parameter module 1220, a volume generation engine 1225, and data stores(s) 1230. In some embodiments, the data stores 1230 are located external to the transport network coordination system 1200 but coupled thereto to provide stored information to the transport network coordination system 1200. The transport network coordination system 1200 may comprise other components that may or may not be related to the generation of the optimized network of flight paths and operations volume (e.g., components found in the transport network coordination system 215 of FIG. 3).

The network creation module 1205 manages the creation of a source network of flight paths or routes. The source network represents nearly a complete set of all possible flight paths between any two points (e.g., vertiports or hubs) given constraints. In example embodiments, the network creation module 1205 selects a set of nodes and generates segments of a flight path between pairs of the nodes. These nodes may be spaced (e.g., uniformly) in a grid pattern that is repeated regularly for different altitude bands. The network creation module 1205 also selects or creates a set of edges that connect subsets of the nodes. In some embodiments, each node is initially connected to a set number of nodes (e.g., six nodes) immediately adjacent to it (e.g., four horizontally, two vertically) to form the edges. In further embodiments, additional configurations may be evaluated such as diagonal edges. A series of edges between two points (e.g., origin and destination) forms a flight path or route.

Once the source network of paths or routes is created, the cost module 1210 assigns a cost for traversing each edge. Accordingly, the cost module 1210 accesses data sets for use in the cost determination from the datastores 1230. The data sets include one or more of historical aircraft track data, terrain altitude data, obstacle/building height and location data, noise maps, population data (e.g., census blocks), backup landing site data, airspace classes and other relevant boundary data (e.g., Mode-C veil, special use airspace, military operations area, sensitive sites), or road and rail infrastructure.

Historical aircraft track data comprises latitude, longitude, and altitude of aircraft tracked over a given time period (e.g., 1.5 years). The historical aircraft track data is used by the transport network coordination system 1200 to minimize encounters that occur between traditional aircraft and aircraft flying within the optimized network (e.g., avoid high traffic areas). In some embodiments, the historical aircraft track data is accessed from a NASA data warehouse and may include visual flight rules (VFR) traffic. In these embodiments, data files are extracted and converted into a format (e.g., cvs files, Matlab data structures) that is usable by the transport network coordination system 1200.

The terrain altitude data provides altitude of natural structures in the environments and the obstacle/building height and location data provides altitudes of man-made structures. These altitude data are used to provide a minimum altitude that an aircraft can fly.

In some embodiments, the noise maps are used to generate paths over noisy parts of an area instead of less noisy areas. In other embodiments, the noise maps are used to generate paths in less noisy areas to minimize an increase in noise in already noisy areas.

Population data and road and rail infrastructure data are used to indicate areas that should be avoided. For example, it may be undesirable to have a flight path over a heavy populated area. Similarly, a flight path over a heavily used road or railway is undesirable because a mishap with an aircraft can negatively impact the road or railway.

Using the accessed data, the cost engine 1210 aggregates or integrates relevant data sets for each node of an edge and assigns a scalar value of cost for each edge as it relates to each metric. Ideally, the cost engine optimizes by minimizing costs as a function of these different metrics. The cost engine 1210 determines a weighted cost for each edge by incorporating metrics and a weight vector. In example embodiments, the cost engine 1210 calculates the cost of traversing each node. For example, there is a cost as a function of the number of aircraft in proximity to a particular edge (e.g., how many aircraft at that edge over the last 1.5 years), how high that edge is above ground, a noise profile of edge, and so forth. The cost engine 1210 combines all of these metrics using linear weights (e.g., machine learned weights) and derives a single cost. In example embodiments, the weighted cost includes distance and/or a time-based measure.

Once the cost for traversal of each edge is assigned, the cost module 1210 determines a lowest or minimum cost path between each relevant origin and destination. In one embodiment, Dijkstra's algorithm is used to determine the minimum cost paths. However other algorithms that compute a minimum cost between any two points on a graph can be used.

The route optimization engine 1215 optimizes these lowest cost paths. In example embodiments, the route optimization engine 1215 applies a Douglas-Peuker algorithm to simplify the paths. The minimum cost path may contain many collinear nodes and/or zig-zagging sequences of nodes (e.g., when diagonal edges are not included). Applying the Douglas-Peucker algorithm removes extraneous points. In some cases, all but two collinear nodes are removed and zig-zag segments are converted into diagonal segments. Furthermore, eccentricity of removed points are iterated until a calculated cost of a resulting path is still within a predetermined factor (e.g., 110%) of an original, optimal path cost. For instance, an eccentricity parameter that dictates whether points are retained may be varied (e.g., increased) on successive loops of the algorithm as long as the newly computed cost of traversal remains close to the original, minimum-cost value (e.g. increasing by not more than 10%).

The route optimization engine 1215 also reduces redundancy in the optimized network. In example embodiments, the route optimization engine 1215 identifies stretches of overlapping path segments that can be merged into a single path and merges these segments. Additionally, the route optimization engine 1215 builds a map between unique, contiguous path segments and segments used for each origin/destination pair.

Finally, the route optimization engine 1215 creates leg-based routes between relevant origin/destination pairs. In example embodiments, the route optimization engine 1215 extracts waypoints that comprise sequence of segments traversed for each origin/destination pair. The resulting waypoint-based route is then converted into a leg-based route by the route optimization engine 1215. By including altitude constraints, an exact flight path or route can be determined. This flight path can then be used to generate a trajectory prediction. In one embodiment, the optimized routes comprise a corridor having multiple lanes (e.g., at different altitudes or spaced next to each other as shown in FIGS. 11A and 11B) whereby each lane has essentially the same cost. These lanes may be referred to as skylanes.

The operational volume represents a piece (or segment) of airspace that surrounds a flight path, route, or trajectory. A set of operational volumes forms an operations volume. In example embodiments, the operational volume is defined by the four-dimensional coordinates of its sectional geometry. The types of geometry include, for example, a polygon with a rectangular section having eight vertices (e.g., four on a bottom section and four on a top section) and a tube with a circular section defined by a radius and a length of the tube. Different types of geometry can be used for different types of aircraft and/or based on the preference of an entity associated with the aircraft (e.g., vendor, manager, manufacturer, third-party operator). For example, volumes of different geometries can be generated based on the physical dimensions and/or other characteristics of the particular aircraft assigned to the associated route/path.

A linear size of the operational volume or segment may be dependent on the route. For example, if the route is given every ten meters, the operational volume can be calculated every ten meters. In an example where the route is a trajectory and a new data point of the trajectory is given every millisecond, the operational volume can be calculated every millisecond. However, if there is a limit to the number of operational volumes for a route, logic finds the minimum distance between two points that creates a number that meets the limit.

A series of operational volumes forms an operations volume which, in one embodiment, is a three-dimensional representation of the skylane between two locations (e.g., an origin and destination). The operations volumes follow the routes or trajectories generated by the transport network coordination system 215, 1200. In some embodiments, the routes or trajectories for which the operations volumes are generated are the optimized routes or skylanes (e.g., trajectory or leg-based route) determined by the route optimization engine 1215.

In order to enable the volume generation process, the parameter module 1220 manages parameters inputted into the process. The inputs comprise files containing algorithm parameters and constraint parameters. The algorithm parameters are variables of the volume generation process (generation algorithm) and include a geometry of the volume (e.g., circular or rectangular), a minimum distance between points in the output polylines need to be set as a function of a volume width (e.g., a Douglas-Peucker epsilon), dimensions of the volume (e.g., a width of a section, a height of the section), and/or a number of degrees per point (for leg-based routes). The constraint parameters are external constraints and comprise minimum and maximum number of vertices per polygon, minimum and maximum number of individual volumes per operations volume, minimum and maximum number of individual volume duration, maximum bounding box dimension, and/or whether the volume has to be horizontal.

In one embodiment, a vehicle (e.g., aircraft) configuration performance can be taken into consideration as well. For example, if the aircraft flies vertically (e.g., a VTOL), it may not need as large of volume to fly in. As such, the volume can be reduced around the configuration performance since the aircraft is good at climbing vertically. As such, the volume generation process can build static volume around routes but can also create volumes that are appropriate around aircraft type to match its profile instead of being bigger to encompass more possibilities. In one case, the vehicle configuration performance is incorporated by way of the route (e.g., skylane) assigned to the vehicle based on its configuration performance.

With the input files for the route, algorithm parameters, and constraint parameters, the volume generation engine 1225 generates segments of volume (the operational volume) for the route. In some embodiments, the volume generation engine 1225 constructs rectangular sections such that each one forms an orthogonal surface to the route. The volume generation engine 1225 generates volume segments such that each is centered around the axis formed by any two successive waypoints of the route. Thus, an operations volume for the entire route comprises airspace that is centered around the axis formed by the route.

Additionally, the volume generation engine 1225 computes an intersection of each operational volume end with its neighbor operational volume start. The intersection computation ensures that an intersecting plane is found between any two neighboring operational volumes. Although an intersecting plane can be found between any two neighboring operational volumes, the two neighboring operational volumes may not intersect the plane at the same points.

Furthermore, the volume generation engine 1225 corrects for any twists. To prevent non-conformance with height and width requirements, the volume generation engine 1225 ensures that two neighboring operational volumes connect on an outer perimeter formed by the two sets of four intersecting points with the intersecting plane.

In example embodiments, the volume generation engine 1225 also modifies the generated volumes when external imposed requirements are not satisfied. Accordingly, the volume generation engine 1225 may loop over a list of volumes and ensures that each volume is contained within a bounding box of specified dimension provided as one of the inputs. The volume does not meet the bounding box dimension requirement if the computed bounding box lateral or/and vertical dimensions of the volume exceeds the required dimension. When the volume does not meet the bounding box dimension requirement, the volume generation engine 1225 performs one or more mitigation processes. For example, the volume generation engine 1225 loops over the list of volumes and ensures that the number of volumes is less than or equal to the required maximum number of volumes per trajectory/route (which is given as input). In another example, the volume generation engine 1225 loops over the list of volumes and ensures that the number of vertices/edges per polygon is less than or equal to the required maximum number of vertices/edges per polygon (which is given as input). Further still, the volume generation engine 1225 may loop over the list of volumes and ensures that the duration of each volume is less or more than required duration.

An aggregation of the generated operational volumes (e.g., segments of volume for the route) forms the operations volume for the entire route. In some embodiments, the operations volumes are visualized in graphs that are displayed to various entities. For example, the operations volume can be shown to a local and/or remote pilot of an aircraft flying along an optimized route. For instance, if the volume is defined with a rectangular section having four corners, the output is longitude and latitude of each of those corners. The visualization of this volume is a plot of those points in order. Alternatively, if the volume is defined with a circular section, then the output comprises the position of the center of the volume and the radius.

Figure 13:
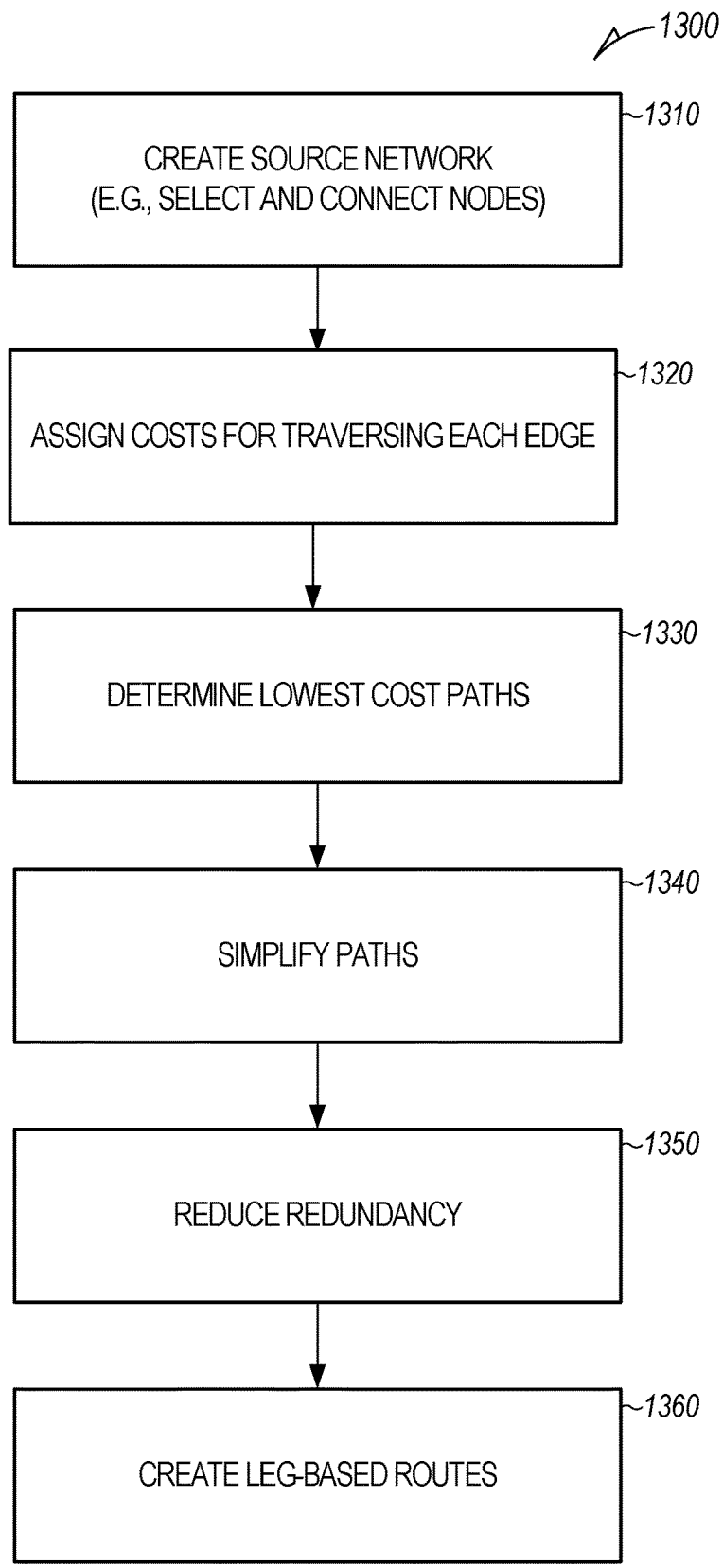
FIG. 13 is a flowchart illustrating a method for generating an optimized network of flight paths.

FIG. 13 is a flowchart illustrating a method 1300 for generating an optimized network of flight paths. Operations in the method 1300 are performed by the transport network coordination system 1200, using components described above with respect to FIG. 12. Accordingly, the method 1300 is described by way of example with reference to the transport network coordination system 1200. However, it shall be appreciated that at least some of the operations of the method 1300 may be deployed on various other hardware configurations or be performed by similar components residing elsewhere. Therefore, the method 1300 is not intended to be limited to the transport network coordination system 1200.

In operation 1310, the network creation module 1205 accesses or create the source network. In example embodiments, the network creation module 1205 selects a set of nodes. These nodes may be spaced uniformly in a grid pattern that is repeated regularly for different altitude bands. In some embodiments, each node is initially connected to a set number of nodes (e.g., six nodes) immediately adjacent to it (e.g., four horizontally, two vertically) to form edges. A series of edges forms a path. The source network represents nearly a complete set of all possible paths between any two points given constraints.

In operation 1320, the cost module 1210 assign costs for traversing each edge. In example embodiments, the cost module 1210 accesses data sets that include one or more of historical aircraft track data, terrain altitude data, obstacle/building height and location data, population data (e.g., census blocks), backup landing site data, airspace classes and other relevant boundary data (e.g., Mode-C veil, special use airspace, military operations area, sensitive sites), or road and rail infrastructure. Using the accessed data, the cost engine 1210 aggregates or integrates relevant data sets for each node of an edge and assigns a scalar value of cost for each edge as it relates to each metric. The cost engine 1210 determines a weighted cost for each edge by incorporating metrics and a weight vector. In example embodiments, the weighted cost includes distance and/or a time-based measure.

In operation 1330, the cost module 1210 determines lowest cost paths. In one embodiment, Dijkstra's algorithm is used to determine the minimum cost paths. However other algorithms that compute a minimum cost between any two points on a graph can be used.

Subsequently, the route optimization engine 1215 optimizes these lowest cost paths. In operation 1340, route optimization engine 1215 simplifies the paths. In one embodiment, the route optimization engine 1215 applies a Douglas-Peuker algorithm to simplify the paths. The minimum cost path may contain many collinear nodes and/or zig-zagging sequences of nodes (e.g., when diagonal edges are not included). Applying the Douglas-Peucker algorithm removes extraneous points. In some cases, all but two collinear nodes are removed and zig-zag segments are converted into diagonal segments.

In operation 1350, the route optimization engine 1215 reduce redundancy in the optimized network. In example embodiments, the route optimization engine 1215 identifies stretches of overlapping path segments that can be merged into a single path and merges these segments. Additionally, the route optimization engine 1215 builds a map between unique, contiguous path segments and segments used for each origin/destination pair.

In operation 1360, the route optimization engine 1215 creates leg-based routes between relevant origin/destination pairs. In example embodiments, the route optimization engine 1215 extracts waypoints that comprise sequence of segments (e.g., edges) traversed for each origin/destination pair. The waypoints-based route is then converted into a leg-based route by the route optimization engine 1215.

Figure 14:
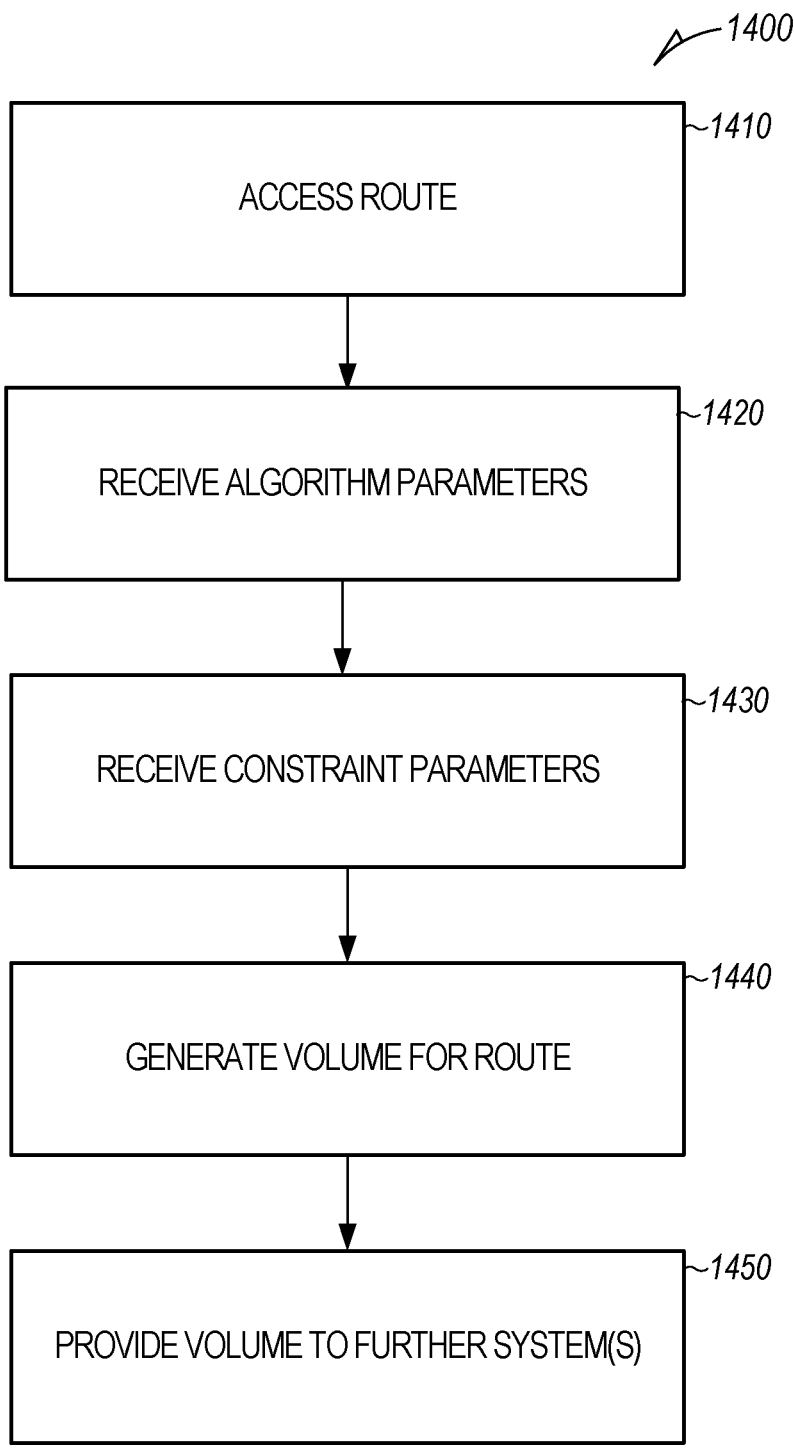
FIG. 14 is a flowchart illustrating a method for generating and utilizing volumes around a flight path.

FIG. 14 is a flowchart illustrating a method 1400 for generating and utilizing volumes around a flight path. Operations in the method 1400 are performed by the transport network coordination system 1200, using components described above with respect to FIG. 12. Accordingly, the method 1400 is described by way of example with reference to the transport network coordination system 1200. However, it shall be appreciated that at least some of the operations of the method 1400 may be deployed on various other hardware configurations or be performed by similar components residing elsewhere. Therefore, the method 1400 is not intended to be limited to the transport network coordination system 1200.

In operation 1410, the volume generation engine 1235 access a route on which to perform the volume generation process. In some embodiments, the route is the optimized route determined by the method 1300 of FIG. 13. That is, the output of the route optimization engine 1215 is input to the volume generation engine 1235. As such, a data file for the optimized route may be received, for example, from the route optimization engine 1215. Alternatively, the data file for the optimized route is accessed from a datastore (e.g., datastore 1230). Alternative embodiments can utilize other routes.

In one embodiment, the route input file is a trajectory input file that contains a list of waypoints that defines the trajectory. Each waypoint is characterized by its latitude, longitude, altitude, and a corresponding timestamp. Once the input file is read, the data is formatted as a dataframe for which each row represents a waypoint and each column defines its latitude, longitude, altitude, and timestamp. The input file may contain waypoints that may not be all necessary to define volumes. Therefore, the dataframe is processed using the Douglas-Pucker algorithm to reduce the spatial data set size and stream similar waypoints from the raw list. The resulting dataframe contains a list of waypoints which represents a streamlined subset of the original waypoint list. Once the data is processed, the volume generation process is applied for any two successive given waypoints at a time.

In another embodiment, the route input file is a leg-based input file that contains a list of legs that defines the route. The input file is read leg-by-leg and each contained waypoint described by its type, latitude, longitude, and altitude is stored in order in a dataframe. A waypoint type can be "end waypoint" and "central waypoint." The altitude is set by an altitude_constraints_msl_ft.

In operation 1420, the parameter module 1220 receives algorithm parameters. The algorithm parameters are received (or accessed) as a file containing the algorithm parameters. The algorithm parameters are variables of the volume generation process (generation algorithm) and includes one or more of a minimum distance between points in the output polylines need to be set as a function of a volume width (e.g., a Douglas-Peucker epsilon), a width of a rectangular section, a height of the rectangular section, and/or a number of degrees per point (for leg-based routes).

In operation 1430, the parameter module 1220 receives constraint parameters. The constraint parameters are received (or accessed) as a file containing constraints. The constrain parameters comprise one or more of minimum and maximum number of vertices per polygon, minimum and maximum number of individual volumes per operations volume, minimum and maximum number of individual volume duration, and/or maximum bounding box dimension.

In operation 1440, the volume generation engine 1225 generates an operations volume for the inputted route (accessed in operation in 1410). In one embodiments, the volume generation engine 1225 constructs sections (segments) such that each one forms an orthogonal surface to the route.

For a route that is input as a trajectory file, the input data is formatted and preprocessed. Then, the volume generation engine 1225 constructs sections or segments (e.g., rectangular or circular sections) such that each one forms an orthogonal surface to the route. The volume generation engine 1225 generates volumes (e.g., operational volumes) such that each is centered around the axis formed by any two successive waypoints of the route. Next, the volume generation engine 1225 computes an intersection of each volume end with its neighbor volume start. Finally, the volume generation engine 1225 corrects for any twists.

In an embodiment where the route is input as a leg-based route, the input data is formatted. A dataframe is processed for any two given waypoints at a time. The previous waypoint is always stored when in a next iteration, so that previous, current, and next waypoints are available at each iteration except for the last. If the current and next waypoints have an "end waypoint" type then apply the volume generation engine 1225 constructs rectangular or circular sections (volume segments) such that each one forms an orthogonal surface to the route. Alternatively, if the previous, current, and next waypoints are respectively "end waypoint," "central waypoint," and "end waypoint," then an angle formed by an arc defined from one "end waypoint" to the other "end waypoint" is determined. Next, the volume generation engine 1225 computes an intersection of each volume (segment) end with its neighbor volume (segment) start. Finally, the volume generation engine 1225 corrects for any twists. The aggregation of the volume segments of a route results in an operations volume for the entire route.

In operation 1450, the volume generation engine 1225 provides the generated operations volume to further systems. In one case, the operations volume is broadcast to other airspace service providers so that the other airspace service providers see where aircraft associated with the transport network coordination system 1200 are flying. In another case, the operations volume is communicated to an aircraft so that the aircraft knows where it is allowed to fly. Further still, the operations volume is used by the transport network coordination system 1200 (or another similar system) to monitor the aircraft and ensure it stays within its performance bounds. In yet another case, the operations volume is graphically presented (e.g., transmitted) in a pilot application that displays the graphical representation of the operations volume on a user interface to a pilot. The operations volume can also be provided to a network operations center that is monitoring an entire fleet of air traffic.

Figure 15:
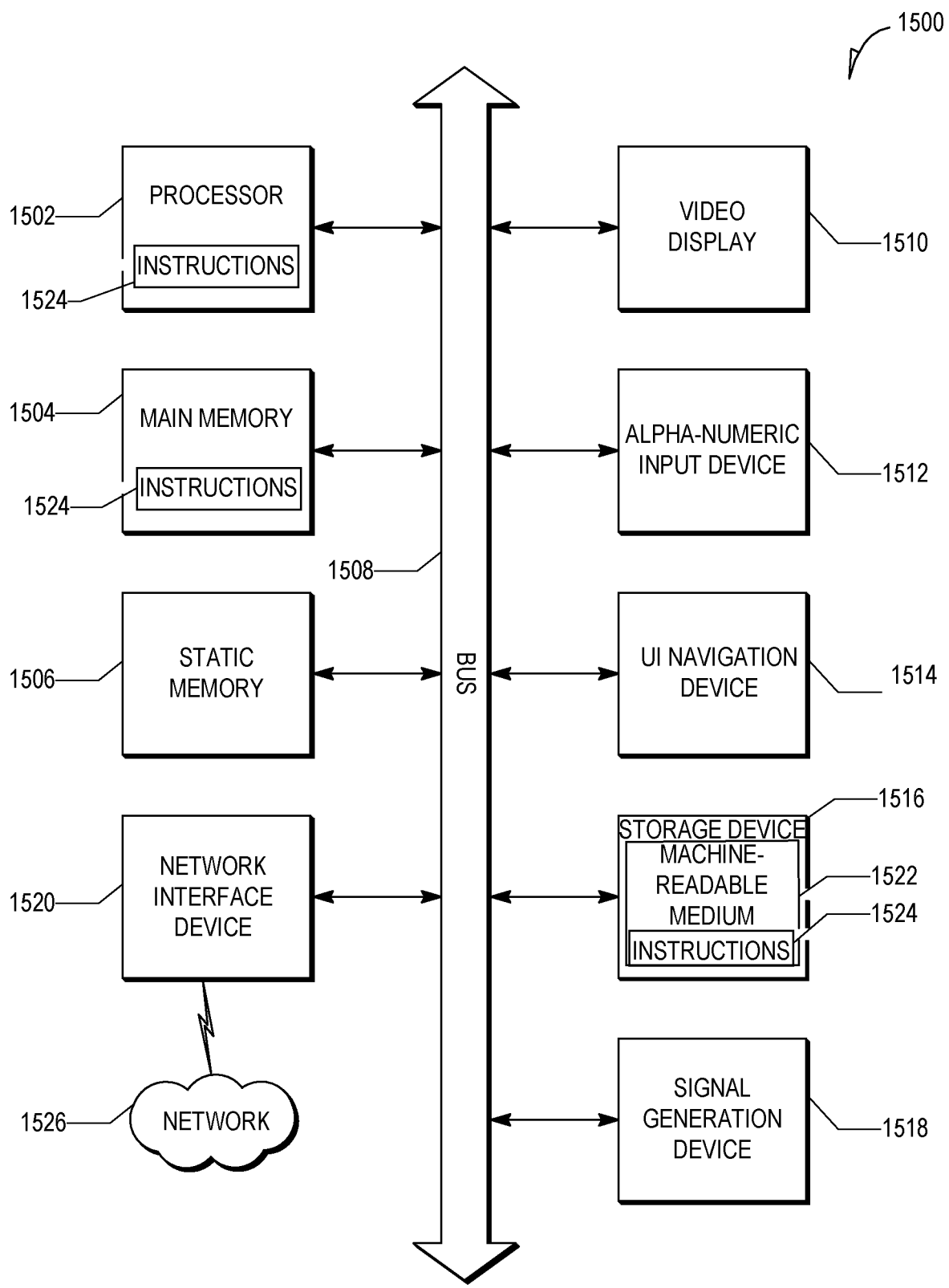
FIG. 15 is a block diagram of a machine that may be implemented in one or more of the disclosed embodiments.

FIG. 15 illustrates components of a machine 1500, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 15 shows a diagrammatic representation of the machine 1500 in the example form of a computer device (e.g., a computer) and within which instructions 1524 (e.g., software, a program, an application, an applet, an app, or other executable code) for causing the machine 1500 to perform any one or more of the methodologies discussed herein may be executed, in whole or in part.

For example, the instructions 1524 may cause the machine 1500 to execute the flow diagrams of FIGS. 5, 6, 8, 13, and 14. In one embodiment, the instructions 1524 can transform the general, non-programmed machine 1500 into a particular machine (e.g., specially configured machine) programmed to carry out the described and illustrated functions in the manner described.

In alternative embodiments, the machine 1500 operates as a standalone device or may be connected (e.g., networked) to other machines. In a networked deployment, the machine 1500 may operate in the capacity of a server machine or a client machine in a server-client network environment, or as a peer machine in a peer-to-peer (or distributed) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524 (sequentially or otherwise) that specify actions to be taken by that machine. Further, while only a single machine is illustrated, the term "machine" shall also be taken to include a collection of machines that individually or jointly execute the instructions 1524 to perform any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The processor 1502 may contain microcircuits that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein.

The machine 1500 may further include a video display 1510 (e.g., a plasma display panel (PDP), a light emitting diode (LED) display, a liquid crystal display (LCD), a projector, or a cathode ray tube (CRT), or any other display capable of displaying graphics or video). The machine 1500 may also include an alphanumeric input device 1512 (e.g., a keyboard), an UI navigation device 1514 (e.g., a mouse, a touchpad, a trackball, a joystick, a motion sensor, or other pointing instrument), a storage device 1516, a signal generation device 1518 (e.g., a sound card, an amplifier, a speaker, a headphone jack, or any suitable combination thereof), and a network interface device 1520.

The storage device 1516 includes a machine-readable medium 1522 (e.g., a tangible machine-readable storage medium) on which is stored the instructions 1524 (e.g., software) embodying any one or more of the methodologies or functions described herein. The instructions 1524 may also reside, completely or at least partially, within the main memory 1504, within the processor 1502 (e.g., within the processor's cache memory), or both, before or during execution thereof by the machine 1500. Accordingly, the main memory 1504 and the processor 1502 may be considered as machine-readable media (e.g., tangible and non-transitory machine-readable media). The instructions 1524 may be transmitted or received over a network 1526 via the network interface device 1520.

In some example embodiments, the machine 1500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1504, 1506, and/or memory of the processor unit(s) 1502) and/or storage device 1516 may store one or more sets of instructions and data structures (e.g., instructions) 1524 embodying or used by any one or more of the methodologies or functions described herein. These instructions, when executed by processor unit(s) 1502 cause various operations to implement the disclosed examples.

As used herein, the terms "machine-storage medium," "device-storage medium," "computer-storage medium" (referred to collectively as "machine-storage medium 1522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1522 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1524 can further be transmitted or received over a communications network 1526 using a transmission medium via the network interface device 1520 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

EXAMPLES

Example 1 is a method for generating an optimized network of skylanes and an operations volume around each of these skylanes in which an aircraft should operate. The method comprises creating, by a network system, a source network of paths, the source network comprising a set of possible paths between two locations; assigning, by the network system, a cost for traversing each edge of each path of the source network of paths; aggregating, by the network system, the cost for traversing each edge of each path to obtain a cost for each path of the source network of paths; based on the cost for each path of the source network of paths, identifying, by the network system, a path having the lowest cost, the path having the lowest cost being an optimized route between the two locations; generating, by a hardware processor of the network system, an operations volume for the optimized route, the operations volume representing airspace surrounding the optimized route; and transmitting the operations volume to a further system for use.

In Example 2, the subject matter of Example 1 optionally includes selecting a set of nodes between the two locations; and connecting each node of the set of nodes to a set number of other nodes immediately adjacent to each node to form edges, whereby a series of edges forms a path of the source network.

In Example 3, the subject matter of any one or more of Examples 1-2 optionally include wherein assigning the cost comprises accessing data sets including historical aircraft track data and altitude data; using the accessed data sets, aggregating relevant data sets for each node of each edge; and assigning a scalar value of cost to each edge based on the aggregated data sets.

In Example 4, the subject matter of any one or more of Examples 1-3 optionally include wherein identifying the path having the lowest cost comprises using the Dijkstra's algorithm.

In Example 5, the subject matter of any one or more of Examples 1-4 optionally include optimizing the path having the lowest cost by applying the Douglas-Peuker algorithm to remove extraneous nodes.

In Example 6, the subject matter of any one or more of Examples 1-5 optionally include optimizing the path having the lowest cost by identifying stretches of overlapping path segments and merging the overlapping path segments.

In Example 7, the subject matter of any one or more of Examples 1-6 optionally include creating a leg-based route between the two locations, the creating the leg-based route comprising extracting waypoints that comprise sequence of edges traversed between the two locations; and converting a waypoint-based route comprising the extracted waypoints into the leg-based route.

In Example 8, the subject matter of any one or more of Examples 1-7 optionally include wherein the operations volume comprising airspace that is centered around an axis formed by the optimized route.

In Example 9, the subject matter of any one or more of Examples 1-8 optionally include wherein the generating the operations volume comprises generating segments of volume for the optimized route, each segment of volume being centered around an axis formed by any two successive waypoints of the optimized route; and combining the segments of volume to generate the operations volume.

Example 10 is a machine-storage medium for generating an optimized network of skylanes and an operations volume around each of these skylanes in which an aircraft should operate. The machine-storage medium configures one or more processors to perform operations comprising creating a source network of paths, the source network comprising a set of possible paths between two locations; assigning a cost for traversing each edge of each path of the source network of paths; aggregating the cost for traversing each edge of each path to obtain a cost for each path of the source network of paths; based on the cost for each path of the source network of paths, identifying a path having the lowest cost, the path having the lowest cost being an optimized route between the two locations; generating an operations volume for the optimized route, the operations volume representing airspace surrounding the optimized route; and transmitting the operations volume to a further system for use.

In Example 11, the subject matter of Example 10 optionally includes wherein creating the source network comprises selecting a set of nodes between the two locations; and connecting each node of the set of nodes to a set number of other nodes immediately adjacent to each node to form edges, whereby a series of edges forms a path of the source network.

In Example 12, the subject matter of any one or more of Examples 10-11 optionally includes wherein assigning the cost comprises accessing data sets including historical aircraft track data and altitude data; using the accessed data sets, aggregating relevant data sets for each node of each edge; and assigning a scalar value of cost to each edge based on the aggregated data sets.

In Example 13, the subject matter of any one or more of Examples 10-12 optionally include wherein identifying the path having the lowest cost comprises using the Dijkstra's algorithm.

In Example 14, the subject matter of any one or more of Examples 10-13 optionally include wherein the operations further comprise optimizing the path having the lowest cost by applying the Douglas-Peuker algorithm to remove extraneous nodes.

In Example 15, the subject matter of any one or more of Examples 10-14 optionally include wherein the operations further comprise optimizing the path having the lowest cost by identifying stretches of overlapping path segments and merging the overlapping path segments.

Example 16 is a system for generating an optimized network of skylanes and an operations volume around each of these skylanes in which an aircraft should operate. The system includes one or more processors and a storage medium storing instructions that, when executed by the one or more hardware processors, causes the one or more hardware processors to perform operations comprising accessing an optimized route between two locations; receiving parameters for generating an operations volume for the optimized route; based on the optimized route and the parameters, generating the operations volume for the optimized route, the operations volume representing airspace surrounding the optimized route; and transmitting the operations volume to a further system for use.

In Example 17, the subject matter of Example 16 optionally includes wherein the generating the operations volume comprises generating segments of volume for the optimized route, each segment of volume being centered around an axis formed by any two successive waypoints of the optimized route; and combining the segments of volume to generate the operations volume.

In Example 18, the subject matter of any one or more of Examples 16-17 optionally include wherein the transmitting the operations volume comprises broadcasting the operations volume to other airspace service providers; communicating the operations volume to an aircraft that will fly the optimized route; providing the operations volume to a system that monitors an aircraft flying the optimized route to ensure the aircraft stays within its performance bounds; causing presentation of a graphical representation of the operations volume on a user interface of a pilot application; or providing the operations volume to a network operations center that is monitoring a fleet of air traffic.

In Example 19, the subject matter of any one or more of Examples 16-18 optionally include wherein receiving parameters comprises receiving algorithm parameters, the algorithm parameters comprising one or more of a minimum distance between points in an output polylines need to be set as a function of a volume width; a width of a section of the volume; a height of the section of the volume; or a number of degrees per point.

In Example 20, the subject matter of any one or more of Examples 16-19 optionally include wherein receiving parameters comprises receiving constraint parameters, the constraint parameters comprising one or more of a minimum and maximum number of vertices per polygon; a minimum and maximum number of volume segments per operations volume; a minimum and maximum number of volume segment duration; a maximum bounding box dimension; or an indication whether the volume has to be horizontal.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. A system for dynamic allocation of skylanes of multi-skylane flight corridors, the system comprising:
  one or more hardware processors; and
  one or more non-transitory computer-readable storage media storing instructions that, when executed by the one or more hardware processors, cause the one or more hardware processors to perform operations comprising:
    accessing a route between two locations;
    accessing a corridor associated with the route, the corridor having a plurality of skylanes;
    accessing data descriptive of a demand pattern associated with the route that indicates a first demand data for a first direction along the route and a second demand data for a second direction along the route;
    computing, based on the demand pattern, a first number of first skylanes of the plurality of skylanes that are associated with the first direction for a first interval and a first number of second skylanes of the plurality of skylanes that are associated with the second direction for the first interval;
    transmitting first routing instructions to cause, for the first interval, one or more first vehicles to fly along the first number of first skylanes in the first direction and one or more second vehicles to fly along the first number of second skylanes in the second direction;
    computing, based on the demand pattern, a second number of first skylanes of the plurality of skylanes that are associated with the first direction for a second interval and a second number of second skylanes of the plurality of skylanes that are associated with the second direction for the second interval; and
    transmitting second routing instructions to cause, for the second interval, one or more third vehicles to fly along the second number of first skylanes in the first direction and one or more second vehicles to fly along the second number of second skylanes in the second direction.

2. The system of claim 1, wherein the operations comprise:
  determining, for a first vehicle of the one or more first vehicles, a first operations volume for a first skylane based on one or more first characteristics for the first vehicle.

3. The system of claim 2, wherein the first operations volume comprises a plurality of segments that are respectively associated with a plurality of nodes of a flight path along the route.

4. The system of claim 3, wherein the plurality of segments are linear.

5. The system of claim 3, wherein the plurality of nodes correspond to a precision of the route, wherein the precision is a spatial precision or a temporal precision.

6. The system of claim 2, wherein the one or more first characteristics comprise performance data describing a physical dimension of the first vehicle.

7. The system of claim 2, wherein the one or more first characteristics comprise performance data describing a performance of the first vehicle in a first configuration, and wherein generating the first operations volume comprises:
  computing a size of the first operations volume based on the performance data.

8. The system of claim 7, wherein the vehicle is a Vertical Take Off and Landing (VTOL) aircraft that is operable in a plurality of different configurations, the plurality of different configurations comprising:
  a cruise configuration; and
  a takeoff configuration.

9. The system of claim 8, wherein the performance data describes a performance of the VTOL aircraft when climbing vertically.

10. The system of claim 2, wherein:
  the first operations volume comprises a three-dimensional representation of the first skylane; and
  a second operations volume for a second vehicle of the one or more second vehicles comprises a three-dimensional representation of a second skylane.

11. The system of claim 10, wherein:
  the first operations volume comprises a four-dimensional representation of the first skylane; and
  the second operations volume comprises a four-dimensional representation of the second skylane.

12. The system of claim 1, wherein the transmitting the first routing instructions comprises:
  broadcasting the routing instructions to other airspace service providers;
  communicating the routing instructions to a vehicle that will fly the route;
  providing the routing instructions to a system that monitors the one or more first vehicles flying the route to ensure the one or more first vehicles stay within its performance bounds;
  causing presentation of a graphical representation of the routing instructions on a user interface of a pilot application; or
  providing the routing instructions to a network operations center that is monitoring a fleet of air traffic.

13. The system of claim 12, wherein the routing instructions comprise an operations volume for a first vehicle.

14. The system of claim 1, wherein the plurality of skylines each have a same cost.

15. The system of claim 14, wherein the route is an optimized route having a lowest cost between the two locations and the plurality of skylanes each have the same lowest cost.

16. The system of claim 1, wherein the plurality of skylanes in the corridor includes skylanes at different altitudes.

17. The system of claim 1, wherein the one or more first vehicles are autonomous aircraft.

18. The system of claim 17, wherein the operations comprise:
  determining one or more first operations volumes respectively for the one or more first vehicles that indicate where the one or more first vehicles are allowed to fly.

19. A method for dynamic allocation of skylanes of multi-skylane flight corridors, the method comprising:
  accessing a route between two locations;
  accessing a corridor associated with the route, the corridor having a plurality of skylanes;

accessing data descriptive of a demand pattern associated with the route that indicates a first demand data for a first direction along the route and a second demand data for a second direction along the route;

computing, based on the demand pattern, a first number of first skylanes of the plurality of skylanes that are associated with the first direction for a first interval and a first number of second skylanes of the plurality of skylanes that are associated with the second direction for the first interval;

transmitting first routing instructions to cause, for the first interval, one or more first vehicles to fly along the first number of first skylanes in the first direction and one or more second vehicles to fly along the first number of second skylanes in the second direction;

computing, based on the demand pattern, a second number of first skylanes of the plurality of skylanes that are associated with the first direction for a second interval and a second number of second skylanes of the plurality of skylanes that are associated with the second direction for the second interval; and transmitting second routing instructions to cause, for the second interval, one or more third vehicles to fly along the second number of first skylanes in the first direction and one or more second vehicles to fly along the second number of second skylanes in the second direction.

20. One or more non-transitory computer-readable storage media storing instructions that, when executed by one or more hardware processors, cause the one or more hardware processors to perform operations comprising:

accessing a route between two locations;

accessing a corridor associated with the route, the corridor having a plurality of skylanes;

accessing data descriptive of a demand pattern associated with the route that indicates a first demand data for a first direction along the route and a second demand data for a second direction along the route;

computing, based on the demand pattern, a first number of first skylanes of the plurality of skylanes that are associated with the first direction for a first interval and a first number of second skylanes of the plurality of skylanes that are associated with the second direction for the first interval;

transmitting first routing instructions to cause, for the first interval, one or more first vehicles to fly along the first number of first skylanes in the first direction and one or more second vehicles to fly along the first number of second skylanes in the second direction;

computing, based on the demand pattern, a second number of first skylanes of the plurality of skylanes that are associated with the first direction for a second interval and a second number of second skylanes of the plurality of skylanes that are associated with the second direction for the second interval; and transmitting second routing instructions to cause, for the second interval, one or more third vehicles to fly along the second number of first skylanes in the first direction and one or more second vehicles to fly along the second number of second skylanes in the second direction.

\* \* \* \* \*